(12) United States Patent
Gunasekaran et al.

(10) Patent No.: US 10,911,540 B1
(45) Date of Patent: Feb. 2, 2021

(54) RECOVERING SNAPSHOTS FROM A CLOUD SNAPSHOT LINEAGE ON CLOUD STORAGE TO A STORAGE SYSTEM

(71) Applicant: EMC IP Holding Company LLC, Hopkinton, MA (US)

(72) Inventors: Shanmuga Anand Gunasekaran, Bangalore (IN); Deepak Vokaliga, Hopkinton, MA (US); Michael Anthony, Wilmington, MA (US); Mark Aldred, Franklin, MA (US); Anurag Bhatnagar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/814,492

(22) Filed: Mar. 10, 2020

(51) Int. Cl.
| | |
|---|---|
| G06F 11/14 | (2006.01) |
| G06F 16/11 | (2019.01) |
| G06F 16/22 | (2019.01) |
| G06F 12/16 | (2006.01) |
| H04L 29/08 | (2006.01) |
| G06F 9/54 | (2006.01) |
| H04L 29/06 | (2006.01) |

(52) U.S. Cl.
CPC .......... *H04L 67/1097* (2013.01); *G06F 9/541* (2013.01)

(58) Field of Classification Search
USPC ..................... 709/219, 226, 224, 228, 232
See application file for complete search history.

(56) References Cited

U.S. PATENT DOCUMENTS

| | | |
|---|---|---|
| 8,706,833 B1 | 4/2014 | Bergant et al. |
| 9,503,542 B1 | 11/2016 | Wang et al. |
| 9,563,517 B1 | 2/2017 | Natanzon et al. |
| 9,588,977 B1 | 3/2017 | Wang et al. |
| 9,959,280 B1 | 5/2018 | Whitehead et al. |
| 9,965,216 B1 | 5/2018 | Jaganathan et al. |
| 10,116,764 B1 | 10/2018 | Ayachit et al. |
| 10,154,112 B1 | 12/2018 | Anthony et al. |

(Continued)

FOREIGN PATENT DOCUMENTS

EP 2391968 B1 5/2018

OTHER PUBLICATIONS

Amazon, "Overview of Amazon Web Services," Jan. 2020, 95 pages.

(Continued)

*Primary Examiner* — Jude Jean Gilles
(74) *Attorney, Agent, or Firm* — Ryan, Mason & Lewis, LLP

(57) ABSTRACT

An apparatus comprises a processing device configured to identify a snapshot lineage comprising snapshots of a given set of storage volumes, the snapshot lineage comprising (i) a local snapshot lineage stored on a storage system and (ii) a cloud snapshot lineage stored on cloud storage of a cloud external to the storage system. The processing device is also configured to select a snapshot to recover from the cloud snapshot lineage to the storage system, to create a set of new storage volumes on the storage system, to generate a recovery map linking each of a set of cloud storage volumes on the cloud storage that comprises data of the selected snapshot to at least one of the new storage volumes, and to recover the selected snapshot from the cloud snapshot lineage by copying data from the set of cloud storage volumes to corresponding linked ones of the new storage volumes.

20 Claims, 27 Drawing Sheets

(56) References Cited

U.S. PATENT DOCUMENTS

| | | | |
|---|---|---|---|
| 10,452,453 | B1 | 10/2019 | Kumar et al. |
| 10,496,324 | B2 | 12/2019 | Meiri et al. |
| 10,496,599 | B1 | 12/2019 | Haravu et al. |
| 10,536,522 | B2 | 1/2020 | Bono et al. |
| 10,789,135 | B2 * | 9/2020 | Bade .................. G06F 11/1662 |
| 2011/0167221 | A1 * | 7/2011 | Pangal .................. G06F 3/065 |
| | | | 711/117 |
| 2011/0258461 | A1 * | 10/2011 | Bates .................. G06F 3/0689 |
| | | | 713/190 |
| 2012/0173731 | A1 * | 7/2012 | Lin ...................... G06F 9/5072 |
| | | | 709/226 |
| 2019/0050296 | A1 * | 2/2019 | Luo .................... G06F 11/1458 |
| 2019/0235968 | A1 | 8/2019 | Bono |
| 2019/0243725 | A1 * | 8/2019 | Bade .................. G06F 11/2048 |
| 2019/0332488 | A1 | 10/2019 | Bono et al. |
| 2020/0042404 | A1 | 2/2020 | Kumar |

OTHER PUBLICATIONS

NetApp, "NetApp Snapshot Technology," 2011, 2 pages.
Dell EMC, "Dell EMC VMAX All Flash and VMAX3: Reliability, Availability, and Serviceability," Technical White Paper, Sep. 2019, 53 pages.
Dell Technologies, "Dell EMC Unity: Unisphere Overview," Technical White Paper, Feb. 2020, 41 pages.
Dell EMC, "Dell EMC Unity: Cloud Tiering Appliance (CTA)," Technical White Paper, Mar. 2019, 32 pages.
Dell EMC, "Dell EMC PowerMax: Family Overview," Technical White Paper, Sep. 2019, 51 pages.

* cited by examiner

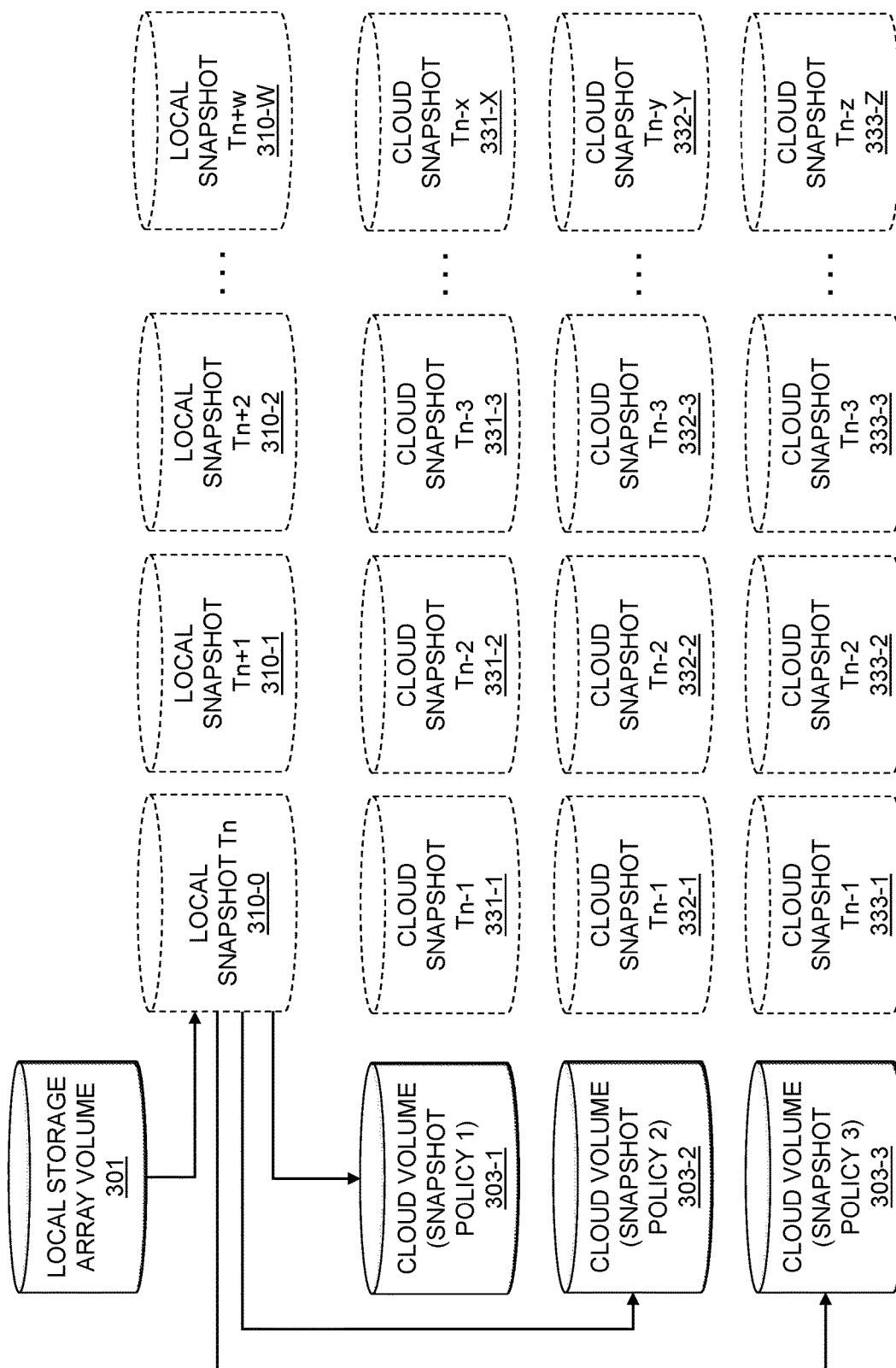

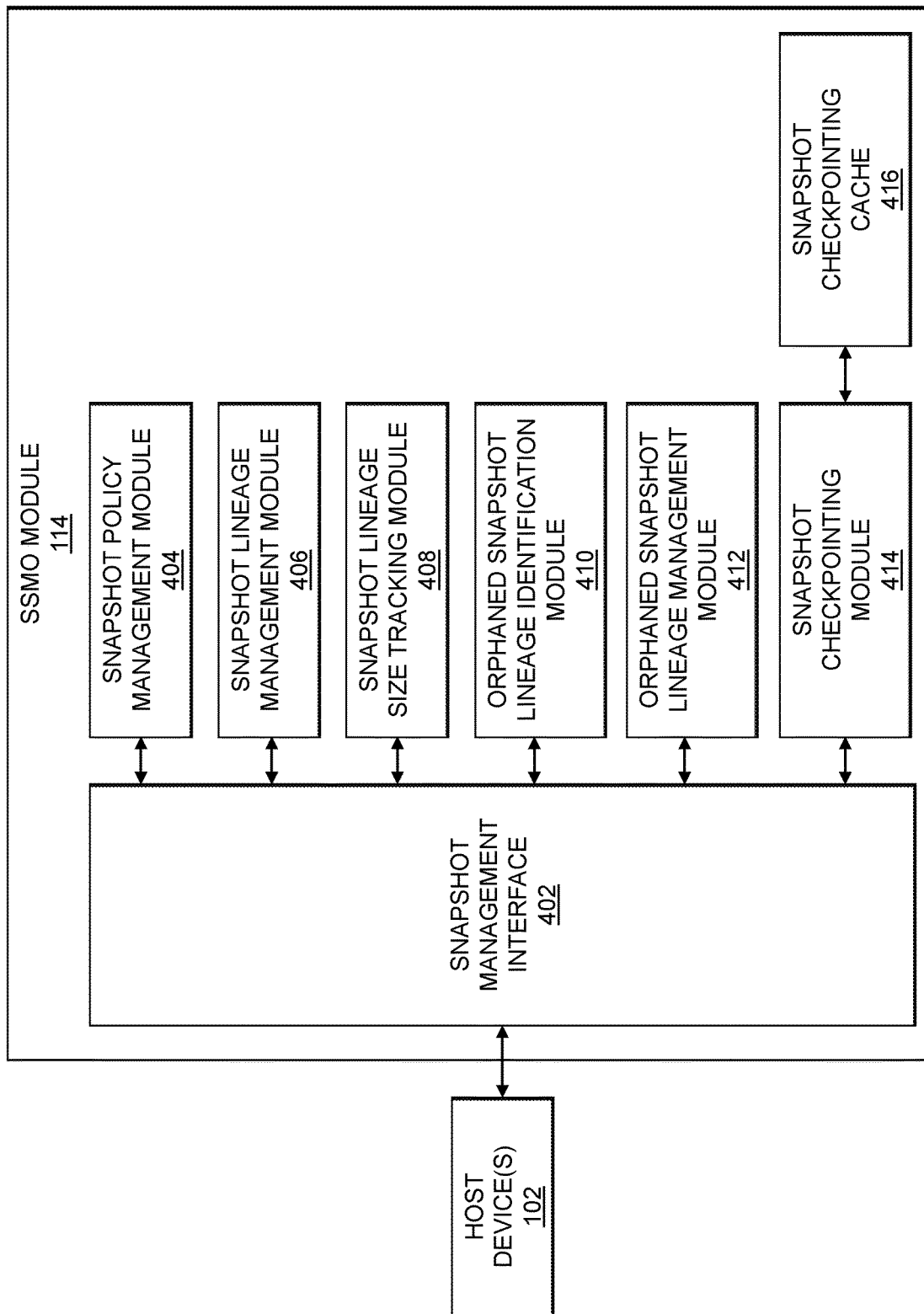

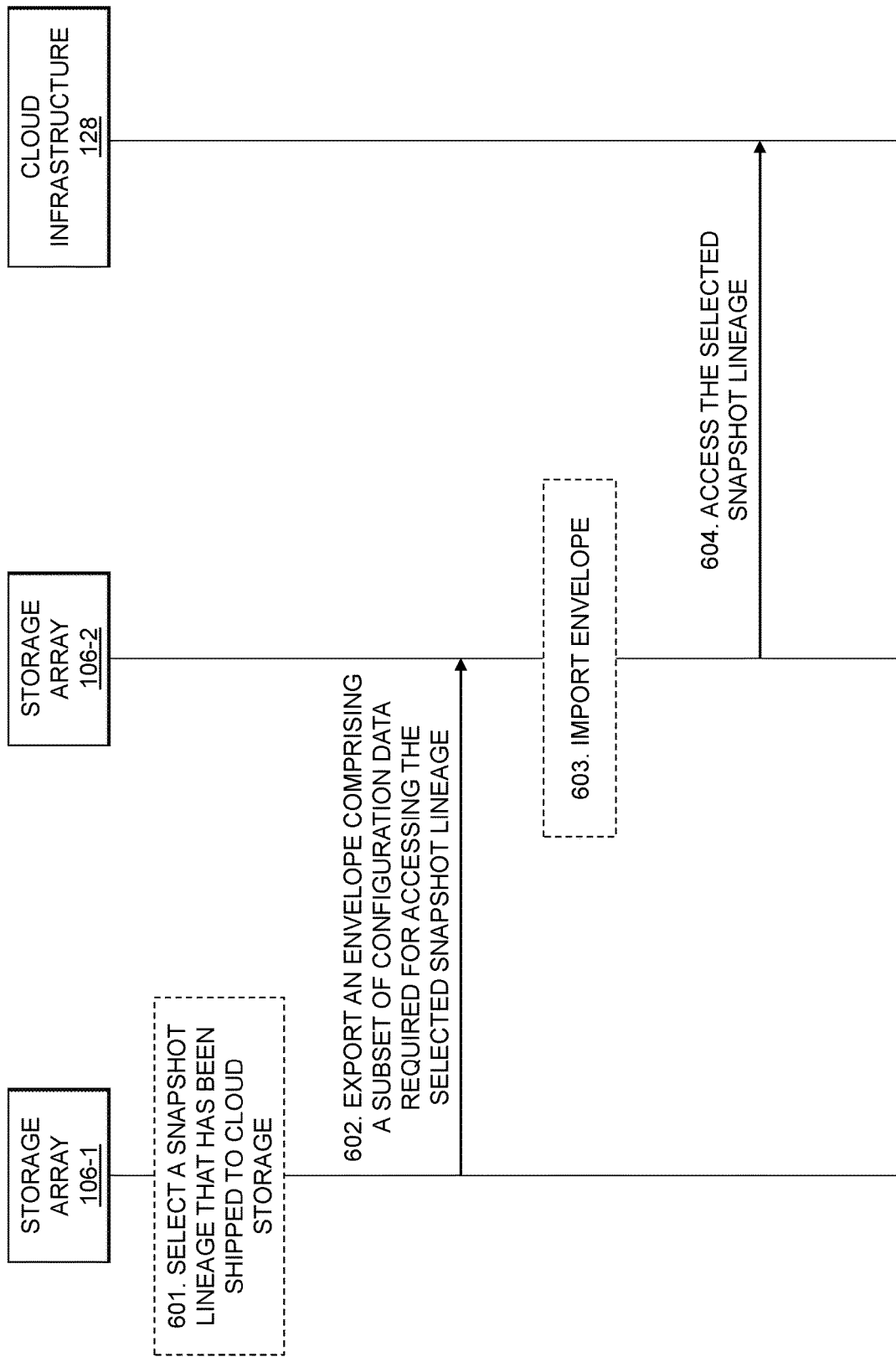

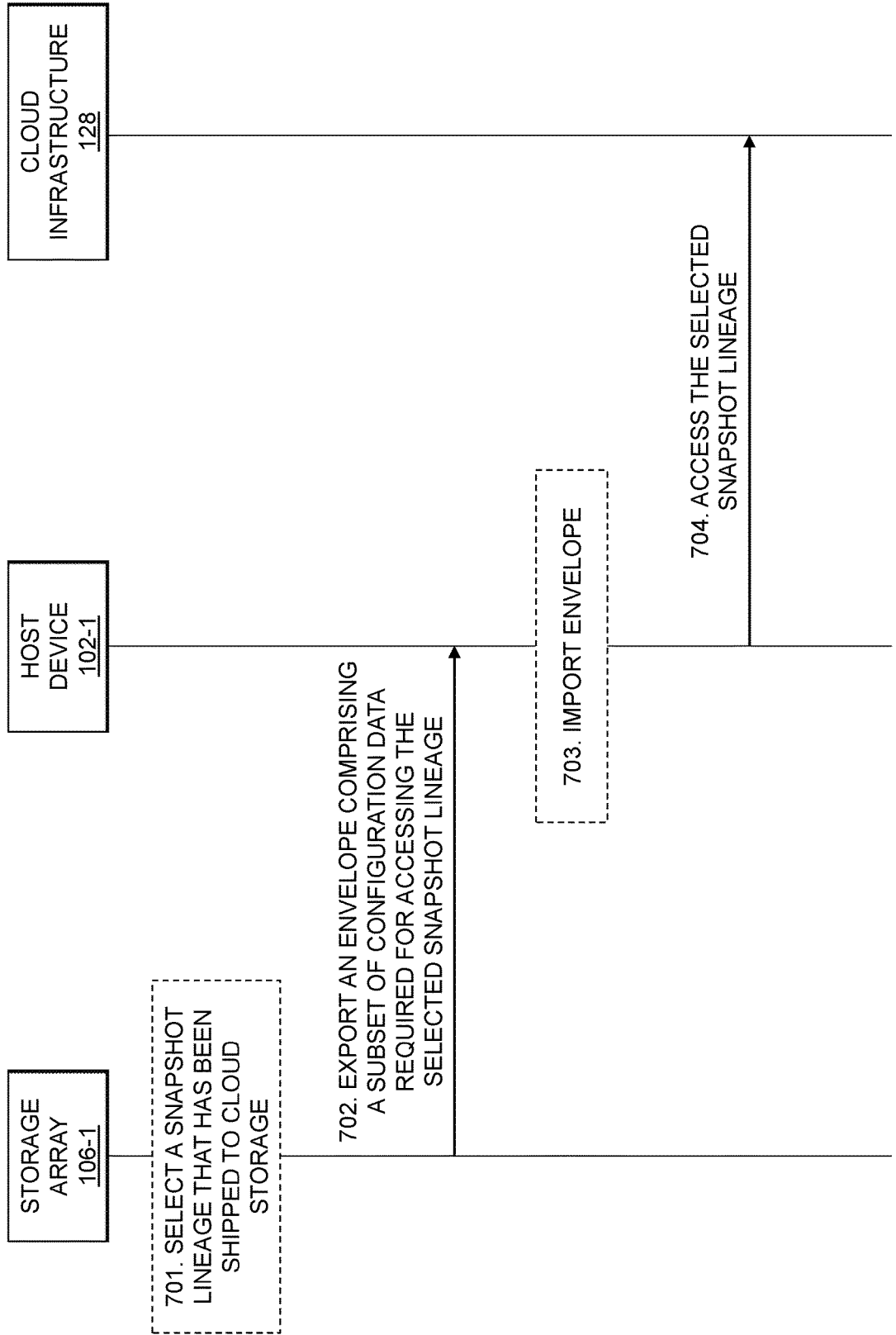

```
900
{
  "storage_group_cloud_snapshots": [
    {
      "storage_group_id": "SG_ID",
      "snapshot_id": 123456789,
      "datetime": 1526552184,
      "snapshots": [
        {
          "volume_identifier": {
            "volume_id": "VOLUME_ID",
            "wwn": "VOLUME_WWN",
            "track_size": 128
          },
          "snapshot_size" : 1234
        }
      ],
      "policy": {
        "cloud_provider": "CLOUD_PROVIDER_ID",
        "encryption": true,
        "compression": true,
        "expiry_date": 1520365899
        "metadata": {}
      }
    }
  ]
}
```

FIG. 9

```
1000
{
 "volume_id": "VOLUME_ID",
 "snapshot_id" : 123456789
}
```

```
1010
{
 "source_volume_track_size": 512,
 "access_volume_identifier": {
   "wwn": "60060480000187900648535594d353855"
 }
}
```

FIG. 10

```
{
  "management_type" : "StorageGroup",
  "storage_group_name" : "SG_NAME",
  "snapshot_id" : 123456789,
  "snapshot_name" : "SNAPSHOT_NAME",
  "start_track" : 0,
  "track_count" : 1024
}
```

1100

```
{
  "bitmaps" : [
    {
      "device_name" : "00123",
      "snapshot_id" : 123456789,
      "snapshot_name" : "SNAPSHOT_NAME",
      "count" : 1024,
      "bitmap" : "////////////////////8="
    },
    {
      "device_name" : "00124",
      "snapshot_id" : 123456789,
      "snapshot_name" : "SNAPSHOT_NAME",
      "count" : 1024,
      "bitmap" : "////////////////////8="
    }
  ]
}
```

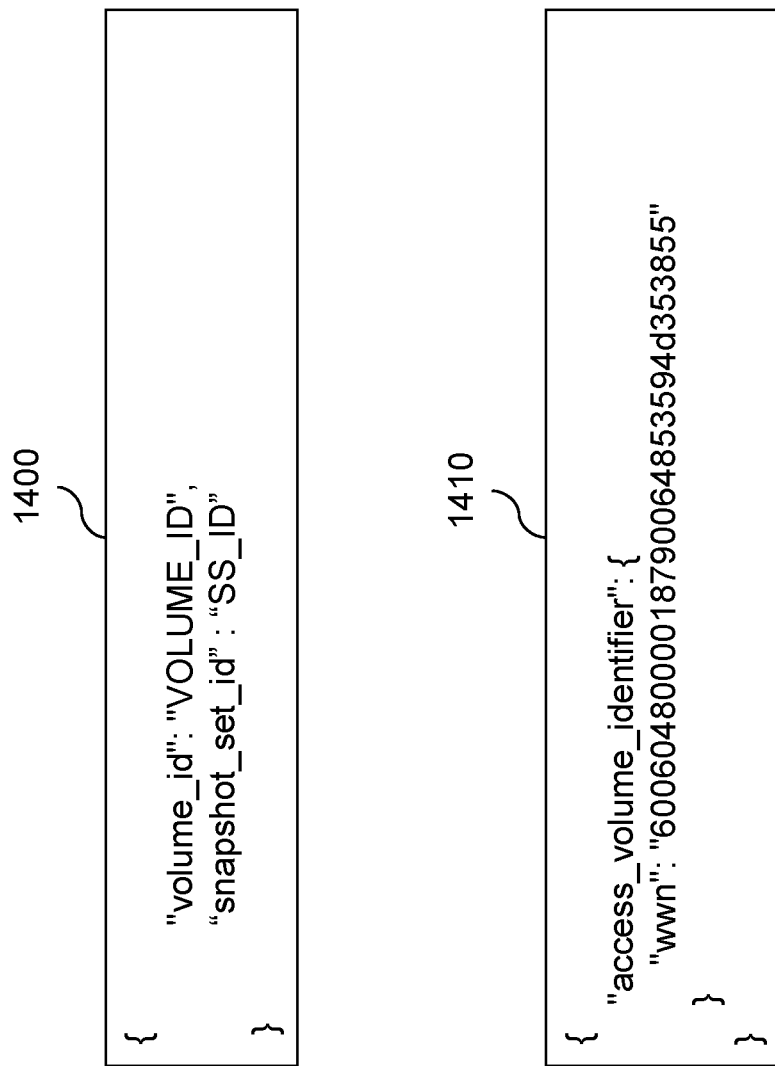

US 10,911,540 B1

RECOVERING SNAPSHOTS FROM A CLOUD SNAPSHOT LINEAGE ON CLOUD STORAGE TO A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (TO) operation requests for delivery to the storage systems. Storage controllers of the storage systems service such requests for IO operations. In some information processing systems, data storage utilizes cloud-based storage resources in addition to local storage resources of the storage systems. The use of cloud-based storage resources can provide various benefits, such as for efficient failure recovery, reduced costs, etc.

SUMMARY

Illustrative embodiments of the present disclosure provide techniques for recovering snapshots from a cloud snapshot lineage on cloud storage to a storage system.

In one embodiment, an apparatus comprises at least one processing device comprising a processor coupled to a memory. The at least one processing device is configured to identify a snapshot lineage comprising one or more snapshots of a given set of one or more storage volumes, the snapshot lineage comprising (i) a local snapshot lineage stored on at least one of one or more storage devices of a storage system and (ii) at least one cloud snapshot lineage stored on cloud storage of at least one cloud external to the storage system, the at least one cloud snapshot lineage comprising at least a subset of the one or more snapshots of the given set of one or more storage volumes that have been copied from the local snapshot lineage to the cloud storage of the at least one cloud external to the storage system. The at least one processing device is also configured to select at least one snapshot to recover from the at least one cloud snapshot lineage to the storage system, to create a set of one or more new storage volumes on the storage system, and to generate a recovery map linking each of a set of one or more cloud storage volumes on the cloud storage of the at least one cloud that comprises data of the selected at least one snapshot to at least one of the set of one or more new storage volumes on the storage system. The at least one processing device is also configured to recover the selected at least one snapshot from the at least one cloud snapshot lineage to the storage system by copying data from the set of one or more cloud storage volumes to corresponding linked ones of the set of new storage volumes on the storage system.

These and other illustrative embodiments include, without limitation, methods, apparatus, networks, systems and processor-readable storage media.

BRIEF DESCRIPTION OF THE DRAWINGS

FIG. 3 illustrates a local snapshot lineage and a set of cloud snapshot lineages for the local snapshot lineage in an illustrative embodiment.

FIG. 4 is a block diagram showing a detailed view of the snapshot shipping management and orchestration module of the snapshot and file tiering management service of FIG. 1 in an illustrative embodiment.

FIG. 6 illustrates a process flow for providing inter-array access to a cloud-based snapshot lineage in an illustrative embodiment.

FIG. 7 illustrates a process flow for providing array-to-compute platform access to a cloud-based snapshot lineage in an illustrative embodiment.

FIG. 9 shows pseudocode for a response to invoking a snapshot ready to archive application programming interface in an illustrative embodiment.

FIG. 10 shows pseudocode for a request to invoke and a response to invoking a snapshot preparation application programming interface in an illustrative embodiment.

FIG. 11 shows pseudocode for a request to invoke and a response to invoking a snapshot differential application programming interface in an illustrative embodiment.

FIG. 14 shows pseudocode for a request to invoke and a response to invoking a snapshot recovery preparation application programming interface in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
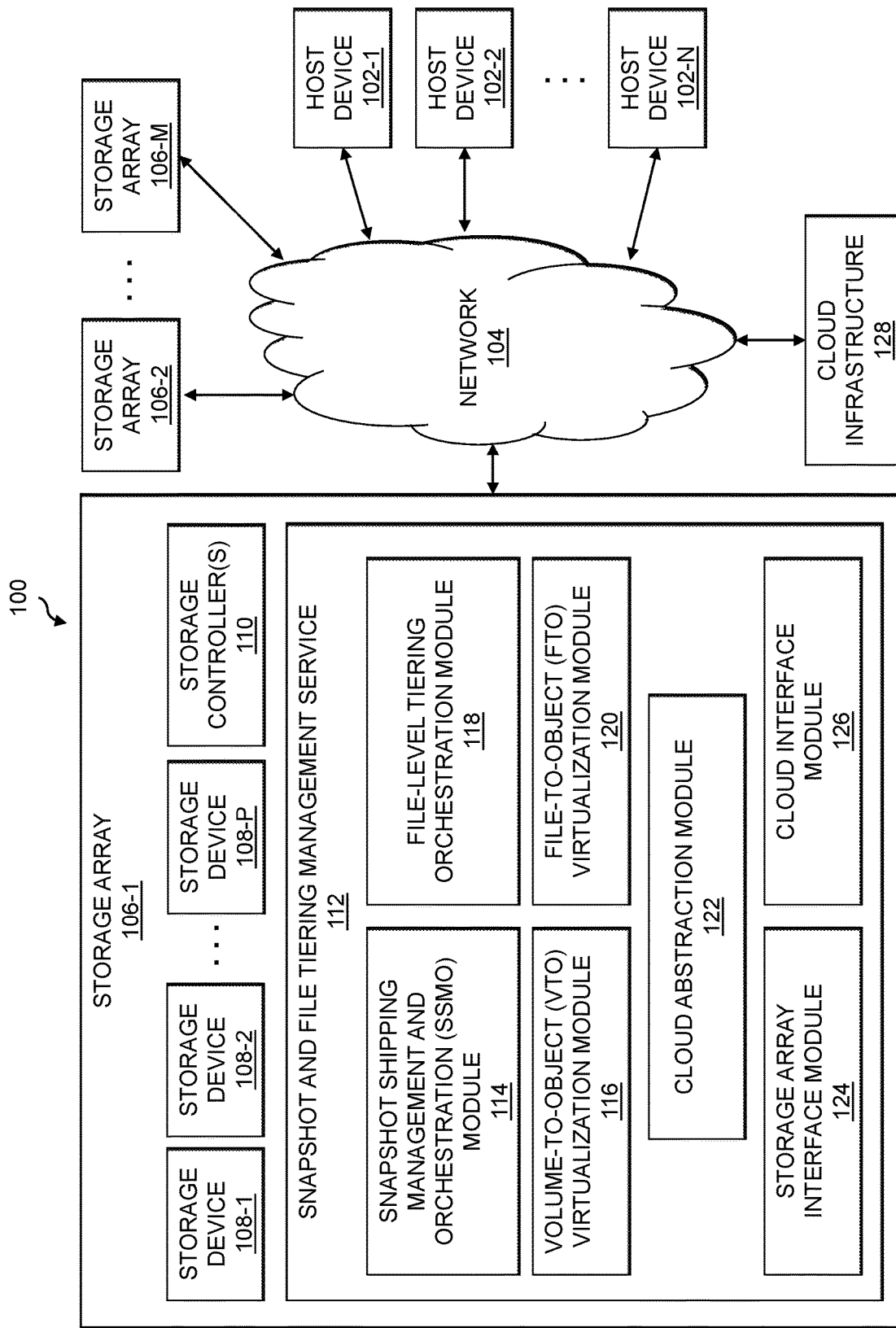
FIG. 1 is a block diagram of an information processing system including a storage array configured with a snapshot and file tiering management service in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines (VMs) of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system. For example, although shown as external to the cloud infrastructure 128 in FIG. 1, the storage arrays 106 in some embodiments may be part of one or more clouds of the cloud infrastructure 128.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAIVI). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage arrays 106 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks.

For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 17 and 18.

The storage array 106-1 implements a snapshot and file tiering management service 112. The snapshot and file tiering management service 112 is assumed to be embedded on the storage array 106-1, and provides snapshot archiving and file-level tiering functionality to cloud infrastructure 128. Although not explicitly shown in FIG. 1 for clarity of illustration, it is assumed in some embodiments that other ones of the storage arrays 106-2 through 106-M implement respective additional instances of the snapshot and file tiering management service 112, as well as respective sets of storage devices and storage controllers in a manner similar to that described herein with respect to storage array 106-1.

The cloud infrastructure 128 may comprise one or more clouds, including one or more public clouds, one or more private clouds, one or more hybrid clouds that include both private cloud and public components, multi-cloud arrangements, combinations thereof, etc. The cloud infrastructure 128 is therefore assumed to comprise one or more clouds, each having respective sets of cloud resources such as compute, storage and network resources in various configurations.

The snapshot and file tiering management service 112 delivers a consistent set of use cases, user flows and functional behaviors related to cloud tiering across the portfolio of storage arrays 106 including storage array 106-1. The snapshot and file tiering management service 112, as illustrated in FIG. 1, is embedded into the storage array 106-1 and may be deeply integrated therein such that, from a host device 102 or user perspective there is a seamless user experience with respect to other features of the storage array 106-1. Although shown as separate from storage controllers 110 in FIG. 1 for clarity of illustration, it should be appreciated that the snapshot and file tiering management service 112 may be implemented at least in part internal to the storage controllers 110. For example, the storage controllers 110 may be implemented utilizing one or more processing devices each comprising at least one processor coupled to at least one memory. The snapshot and file tiering management service 112 may be implemented as virtualization software running on such processing devices.

The snapshot and file tiering management service 112 includes a number of functional modules, including a snapshot shipping management and orchestration (SSMO) module 114, a volume-to-object (VTO) virtualization module 116, a file-level tiering orchestration module 118, a file-to-object (FTO) virtualization module 120, a cloud abstraction module 122, a storage array interface module 124, and a cloud interface module 126.

The SSMO module 114 interacts with the storage array 106-1 (e.g., via the storage controllers 110) to pull data from local snapshots stored on the storage array 106-1 and copy them to the cloud infrastructure 128. Conversely, on a restore from a cloud snapshot, the SSMO module 114 orchestrates movement of data back from the cloud infrastructure 128 to a designated set of storage array volumes of the storage array 106-1. The SSMO module 114 is also configured to track the relationship between snapshots stored on the cloud infrastructure 128 and the local storage volumes of the storage array 106-1.

The VTO module 116 is configured to provide cloud volume and cloud snapshot virtualization (e.g., of object storage used by local storage volumes of the storage array 106-1 to block storage utilized by clouds of the cloud infrastructure 128 in some embodiments). The VTO module 116 provides a target interface (e.g., via iSCSI) for the SSMO module 114 to move data to and from the cloud infrastructure 128.

The file-level tiering orchestration module 118 is configured to implement file-level tiering using a network attached storage (NAS) server that resides on the storage array 106-1. The file-level tiering functionality includes orphan management, policy management, etc.

The FTO module 120 is configured to encapsulate the tracking of files in the cloud infrastructure 128 as well as the actual data movement of files between the NAS server residing on the storage array 106-1 and the cloud infrastructure 128.

The cloud abstraction module 122 provides various functionality for interfacing with the cloud infrastructure 128. Such functionality includes, but not is limited to, compression, encryption, bandwidth throttling, etc. The storage array interface module 124 is used by the storage array 106-1 to control and interact with features of the snapshot and file tiering management service 112 (e.g., using one or more representational state transfer (REST) application programming interfaces (APIs)). The cloud interface module 126 provides one or more APIs for the snapshot and file tiering management service 112 to perform IO operations with the cloud infrastructure 128. The cloud interface module 126 may include or utilize different cloud storage APIs for different ones of the clouds in the cloud infrastructure 128, including various authentication methods.

At least portions of the snapshot and file tiering management service 112 (e.g., one or more of the SSMO module 114, VTO virtualization module 116, file-level tiering orchestration module 118, FTO virtualization module 120, cloud abstraction module 122, storage array interface module 124, and cloud interface module 126) may be implemented at least in part in the form of software that is stored in memory and executed by a processor.

It is to be understood that the particular set of elements shown in FIG. 1 recovering snapshots from a cloud snapshot lineage on cloud storage to a storage system is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
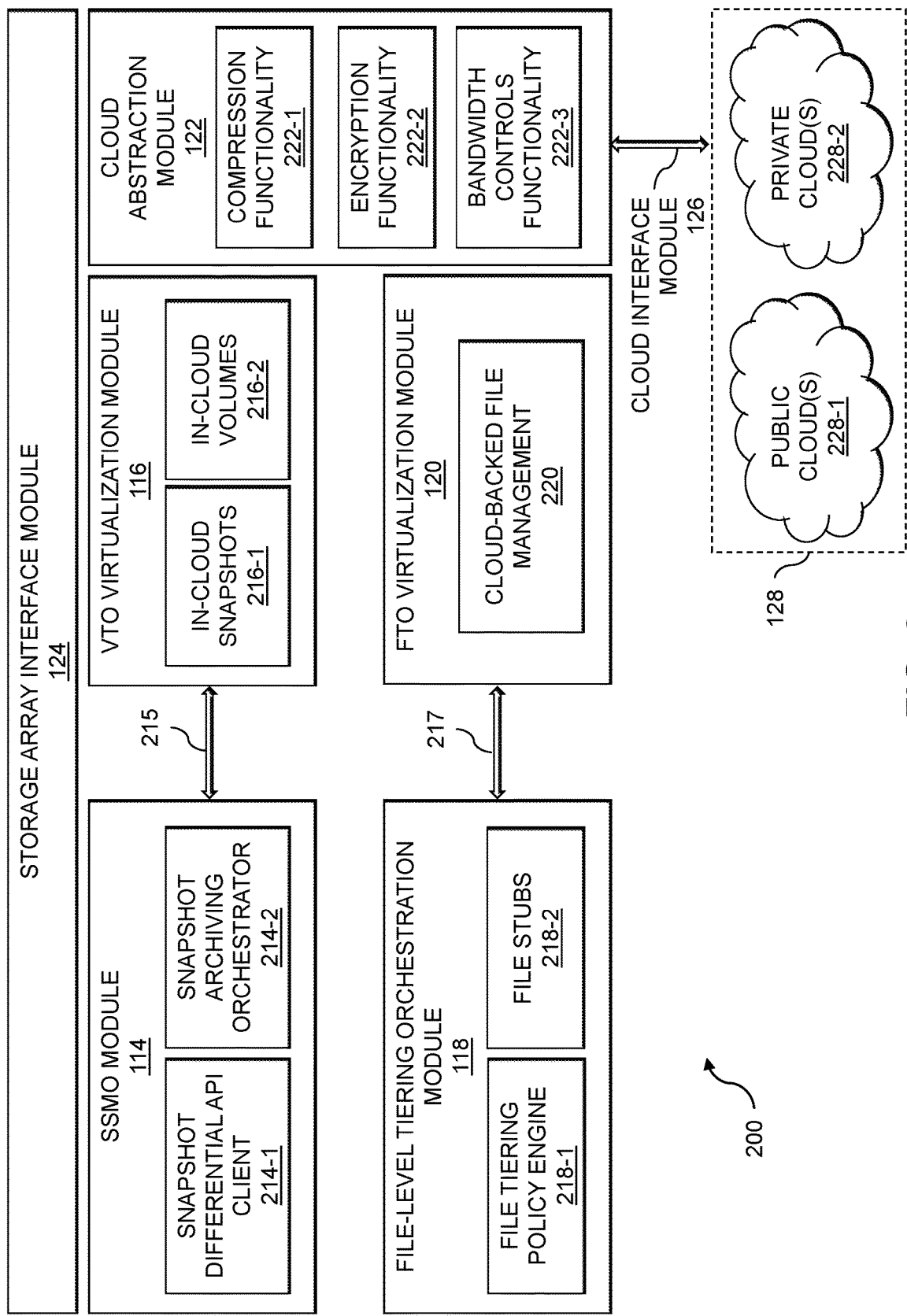
FIG. 2 is a block diagram of a logical view of the snapshot and file tiering management service of FIG. 1 in an illustrative embodiment.

FIG. 2 illustrates a logical view 200 of components of the snapshot and file tiering management service 112 in an illustrative embodiment. The SSMO module 114 provides a snapshot archiving logic layer that includes a snapshot-differential API client 214-1 and a snapshot archiving orchestrator 214-2. The VTO virtualization module 116 provides a VTO virtualization logic layer including in-cloud snapshots 216-1 and in-cloud volumes 216-2. The file-level tiering orchestration module 118 provides a file tiering logic layer including a file tiering policy engine 218-1 and file stubs 218-2. The FTO virtualization module 120 provides a FTO virtualization logic layer including cloud-backed file management 220. The cloud abstraction module 122 provides a cloud abstraction logic layer with compression functionality 222-1, encryption functionality 222-2 and bandwidth controls functionality 222-3. The storage array interface module 124 provides one or more REST APIs for interfacing with the storage array 106-1 (e.g., with local storage volumes thereof, possibly via the storage controllers 110). The cloud interface module 126 provides secure cloud APIs for accessing cloud infrastructure 128 (e.g., one or more public clouds 228-1 and/or one or more private clouds 228-2 thereof). Communication between the SSMO module 114 (e.g., the snapshot archiving logic layer) and the VTO virtualization module 116 (e.g., the VTO virtualization logic layer) may be via an iSCSI protocol or API 215. Communication between the file-level tiering orchestration layer 118 (e.g., file tiering logic layer) and the VTO virtualization module 120 (e.g., the VTO virtualization logic layer) may utilize a distributed hierarchical storage management (DHSM) API 217.

The SSMO module 114 is configured to tier at least a portion of an existing local snapshot lineage of the storage array 106-1 to cloud storage (e.g., object storage) of the cloud infrastructure 128. This results in a snapshot lineage of one or more storage volumes being split between cloud infrastructure 128 and the storage array 106-1. The older pieces of the snapshot lineage are assumed to be archived to the cloud storage of cloud infrastructure 128 and may eventually be deleted in accordance with associated retention policies. This process of archiving and eventual deletion of pieces of the snapshot lineage may continue in perpetuity creating a life-cycle of the snapshots of the one or more storage volumes of the storage array 106-1. By "in perpetuity," it should be understood that the snapshot lineage will be maintained so long as there is a snapshot shipping policy, also referred to herein as a snapshot policy, for a particular local storage volume of the storage array 106-1. The term "local storage volume" as used herein is intended to be broadly construed, so as to include one or more of the storage devices 108, one or more LUNs of the storage array 106-1, a consistency group of the storage array 106-1 (e.g., a set of LUNs of the storage array 106-1), a storage group of the storage array 106-1, etc. More generally, a local storage volume refers to a portion of one or more local storage volumes of the storage array 106-1 that is to be snapshotted in accordance with one or more snapshot policies.

The snapshot and file tiering management service 112 provides snapshot archiving functionality (e.g., via SSMO module 114) for implementing snapshot policies, snapshot lineages, and orchestration and data movement for copying local snapshots from local storage volumes of the storage array 106-1 to the cloud storage of the cloud infrastructure 128 and recovering cloud snapshots from the cloud storage of the cloud infrastructure 128 to the local storage volumes of the storage array 106-1.

The snapshot and file tiering management service 112 may be configured to utilize various cloud providers for snapshot archiving (as well as file-level tiering described in further detail below). The cloud providers may be represented by or associated with containers (e.g., cloud provider containers) or metadata describing associated cloud attributes, including credentials, provider name, geographic region, level of service, etc. The cloud provider containers may be managed by the snapshot and file tiering management service 112 utilizing REST APIs. Both the SSMO module 114 and the file-level tiering orchestration module 118 make use of the cloud provider containers for snapshot archiving and file-level tiering features, respectively.

Snapshot policies may be used to encompass the duration in which a local snapshot resides on the storage array 106-1 before it is archived to the cloud infrastructure 128, the destination cloud provider (e.g., the particular cloud or clouds of the cloud infrastructure 128) to ship the local snapshot to, encryption and compression attributes, etc. The snapshot policies may be fully defined and managed by the storage array 106-1, or by one or more of the host devices 102. In some embodiments, the snapshot and file tiering management service 112 is made aware of the snapshot policies, but may not have the ability to add, modify or remove policies. In other embodiments, however, the snapshot and file tiering management service 112 may be configured to at least partially define the snapshot policies. The snapshot policies may be applied to different local storage volumes of the storage array 106-1 (e.g., to individual local storage volumes of the storage array 106-1, to one or more of the storage devices 108 of the storage array 106-1, to one or more LUNs or LUN groups, to one or more local storage groups of the storage array 106-1, to one or more consistency groups of the storage array 106-1, etc.).

The SSMO module 114 may be configured to apply multiple snapshot policies to the same local storage volume of the storage array 106-1. As a result, multiple snapshot lineages may be stored in the cloud infrastructure 128 for a single local snapshot lineage on the storage array 106-1. For example, a first snapshot policy may be defined specifying that snapshots older than one week are moved to a first set of one or more clouds in the cloud infrastructure 128 with a first set of encryption and compression attributes. A second snapshot policy may be defined specifying that snapshots that are 1 day or older, but less than 1 week old, are moved to a second set of one or more clouds in the cloud infrastructure 128 with a second set of encryption and compression attributes. As another example, different snapshot policies may be specified for moving snapshots of the same age to two different clouds of the cloud infrastructure, using the same or different encryption and compression attributes for each of the two different clouds.

FIG. 3 illustrates how a single local snapshot lineage of the storage array 106-1 can fan out to multiple distinct cloud snapshot lineages based on multiple snapshot policies that are applied to a local storage array volume 301 of the storage array 106-1. A series of local snapshots 310-0, 310-1, 310-2, . . . 310-W (collectively, local snapshots 310) of the local storage array volume 301 are taken at times Tn, Tn+1, Tn+2, . . . Tn+w. A set of snapshot policies are associated with the local storage array volume 301, including snapshot policy 1, snapshot policy 2 and snapshot policy 3.

Snapshot policy 1 may specify that snapshots of the local storage array volume 301 should be moved to a first cloud when reaching a first age (e.g., 1 week), and that encryption and compression should be applied to the local snapshots moved to the first cloud. This is represented in FIG. 3 by cloud volume 303-1, which has associated cloud snapshots 331-1, 331-2, 331-3, . . . 331-X (collectively, cloud snapshots 331) for times Tn−1, Tn−2, Tn−3, . . . Tn−x.

Snapshot policy 2 may specify that snapshots of the local storage array volume 301 should be moved to a second cloud when reaching a second age, which may be the same as or different than the first age, and that encryption but not compression should be applied to the local snapshots moved to the second cloud. This is represented in FIG. 3 by cloud volume 303-2, which has associated cloud snapshots 332-1, 332-2, 332-3, . . . 332-Y (collectively, cloud snapshots 332) for times Tn−1, Tn−2, Tn−3, . . . Tn−y. It should be appreciated that the time Tn−1 for cloud snapshot 332-1 is not necessarily the same as time Tn−1 for cloud snapshot 331-1 (or for cloud snapshot 333-1 described below), as the second age may be different than the first age. This holds true for times Tn−2, Tn−3, etc. as well.

Snapshot policy 3 may specify that snapshots of the local storage array volume 301 should be moved to a third cloud when reaching a third age, which may be the same as or different than the first age and the second age, and that compression but no encryption should be applied to the local snapshots moved to the third cloud. This is represented in FIG. 3 by cloud volume 303-3, which has associated cloud snapshots 333-1, 333-2, 333-3, . . . 333-Z (collectively, cloud snapshots 333) for times Tn−1, Tn−2, Tn−3, . . . Tn−z.

It should be appreciated that the snapshot policies 1, 2 and 3 described with respect to FIG. 3 are presented by way of example only, and that embodiments are not limited solely to use with these snapshot policies. Various other types and combinations of snapshot policies may be used in other embodiments.

Snapshot archiving functionality (e.g., provided by the SSMO module 114) is orchestrated through one or more APIs provided by the storage array 106-1 (e.g., one or more REST APIs) that are exposed to the snapshot and file tiering management service 112. The storage array 106-1 is assumed to provide or expose various APIs for performing tasks required for snapshot archiving and recovery (as well as file-level tiering described in further detail below). Different ones of the storage arrays 106 may provide or utilize different APIs, and thus the snapshot and file tiering management service 112 may be tailored or customized for use with the available APIs of the storage array 106-1 on which it is implemented. In some embodiments, it is assumed that the storage array 106-1 provides the following APIs for use in implementing snapshot archiving functionality: a snapshot ready to archive API; a snapshot preparation API; a snapshot differential API; a snapshot locking API; a snapshot cleanup API; and a snapshot recovery API.

The storage array 106-1, as discussed above, may control and manage the policy engine logic for archiving snapshots (e.g., either directly, or via instruction from one or more of the host devices 102). Thus, the storage array 106-1 provides the snapshot ready to archive API enabling the SSMO module 114 to obtain a list of snapshots that are ready to archive. The SSMO module 114 may be configured to periodically call the snapshot ready to archive API to look for new snapshots on the local storage volumes of the storage array 106-1 that are to be archived to cloud storage of the cloud infrastructure 128 in accordance with the defined policies.

The snapshot preparation API is exposed by the storage array 106-1 to give volume structure to snapshots and for mapping the volume structure so that reads can be performed. The VTO virtualization module 116 utilizes the snapshot preparation API to obtain a "host" view of a local snapshot on one or more local storage volumes of the storage array 106-1 (e.g., a view similar to that of the host devices 102 accessing the storage array 106-1). In this way, the copy of the local snapshot that is stored in cloud storage of the cloud infrastructure 128 can be accessed outside the context of the storage array 106-1.

The SSMO module 114 (e.g., via snapshot differential API client 214-1), calls the snapshot differential API to determine differences between a local snapshot on the storage array 106-1 being archived and previously archived snapshots. This allows the SSMO module 114 to optimize the archiving process by only copying changed blocks between snapshots in the associated snapshot lineage.

The snapshot locking API is used by the SSMO module 114 to lock down "n" and "n−1" local snapshots on the storage array 106-1 so that these local snapshots cannot be deleted while the copy process is in progress. In addition, the new snapshot ("n") may remain locked so that the next future snapshot can calculate a differential relative to the "n" snapshot.

The snapshot cleanup API enables the VTO virtualization module 116 to un-map local snapshots that have been successfully archived. This signals to the storage array 106-1 that the archiving process is completed for a given local snapshot.

The snapshot recovery API enables the VTO virtualization module 116 to map local storage volumes of the storage array 106-1 for writing, so that the SSMO module 114 can recover a cloud snapshot stored in the cloud infrastructure 128 to the storage array 106-1 by copying data from the cloud snapshot to the mapped local storage volumes of the storage array 106-1.

To implement snapshot archiving and recovery data movement, the storage array 106-1 allows the snapshot and file tiering management service 112 (e.g., SSMO module 114 and VTO virtualization module 116) internal IO access to local storage volumes. Such internal IO access may be provided using various protocols, including but not limited to iSCSI, Fibre Channel, etc. This enables the SSMO module 114 to read data from local snapshots on the storage array 106-1 and write that data to cloud snapshots in the cloud infrastructure 128 as part of archiving functionality, and also enables the SSMO module 114 to read data from the cloud snapshots in the cloud infrastructure 128 and write that data to local storage volumes on the storage array 106-1 as part of recovery functionality.

File-level tiering functionality provided by the file-level tiering orchestration module 118 enables user-defined file tiering policies (e.g., specified in file tiering policy engine 218-1) for moving individual files from local storage volumes of the storage array 106-1 to cloud storage of the cloud infrastructure 128. In some embodiments, the cloud infrastructure 128 may implement a "cheaper" object storage as compared to block storage of the local storage volumes of the storage array 106-1, and thus it may be desired to move some files from the storage array 106-1 to the cloud infrastructure 128. File-level tiering may interact closely with a file system of the storage array 106-1, and may utilize file stubbing (e.g., file stubs 218-2) to create links to the data in a file on the storage array 106-1 when the file is moved to cloud storage in the cloud infrastructure 128.

File-level tiering is performed in accordance with defined file tiering policies. A policy, in the file-level tiering context, is a rules-based container that dictates under what circumstances files are moved from the local storage volumes of the storage array 106-1 to the cloud storage of the cloud infrastructure 128. The rules-based container also specifies the particular destination cloud or portion of cloud storage that the files should be sent to. The file tiering policies may specify various criteria, including criteria related to file names, directories, last modified or accessed times, file attributes, etc. File tiering policies may be created by users (e.g., of host devices 102) and are applied to one or more file systems of the storage array 106-1. The file tiering policies may also include or specify whether data of the files should be encrypted, compressed, etc. The file tiering policies may also specify options related to rehydration (e.g., enabling the storage array 106-1 to obtain file data from the cloud storage of the cloud infrastructure 128). What-if scenarios can be run on a file system of the storage array 106-1 using a file tiering policy before it is applied to test for desired results.

File-level tiering functionality may be tightly coupled to the file systems of the storage array 106-1 (e.g., a NAS file system such as SDNAS) through the DHSM protocol, through one or more REST APIs, combinations thereof, etc. Such file system integration enables the file-level tiering orchestration module 118 to control various aspects of file system traversal, data transfer, and file stub management. The tracking of file stubs, in some embodiments, is done using hidden databases embedded in the file systems of the storage array 106-1, which allows for automated accounting of file system stubs in cases where snapshots of the file system are restored.

Files stored on local storage volumes of the storage array 106-1 that are sent to cloud storage of the cloud infrastructure 128 in accordance with file-level tiering policies may be tracked by the FTO virtualization module 120 (e.g., using cloud-backed file management 220). Files sent to the cloud infrastructure 128 may be considered "orphaned" when the last copy of a file stub pointing at that file is deleted. While the discovery of orphaned files may be explicitly managed by users, the FTO virtualization module 120 enables orphan management to be implemented as a behind-the-scenes activity hidden partially or completely from the users. The FTO virtualization module 120 is configured to automatically detect and remove orphaned objects from the cloud storage of cloud infrastructure 128. Additionally, activities such as recovering snapshots of a file system with file stubs to the original source file system of storage array 106-1 can be handled automatically.

The file-level tiering orchestration module 118 may support various methods for "rehydration" of files previously moved from local storage volumes of the storage array 106-1 to cloud storage of the cloud infrastructure 128. In a first method, referred to herein as pass-through recall, the file contents are read from the cloud storage and passed to the client (e.g., one of the host devices 102) without replacing the file stub. In a second method, referred to herein as full recall, the entire file is rehydrated back into the file system of the storage array 106-1 and the file stub is replaced. A third method, referred to herein as partial recall, is similar to pass-through recall in that the file stub is not replaced in the local file system of the storage array 106-1. The partial recall method, however, differs from pass-through recall in that only the part of the file that is needed to satisfy the read request from the client is downloaded from the cloud storage of the cloud infrastructure 128. The choice of which of these methods (e.g., pass-through recall, full recall, partial recall) to utilize may be specified in the file tiering policies applied to the associated local file system of the storage array 106-1. REST APIs may also be used to explicitly control or override the default method chosen for a particular file system.

The snapshot and file tiering management service 112 may be associated with a configuration that contains information pertaining to cloud providers, encryption keys, cloud snapshots, file-level tiering, users, groups, job state, array registration, etc. This configuration should be stored on protected storage of the storage array 106-1 (or saved external to the storage array 106-1, such as on one or more other ones of the storage arrays 106-2 through 106-M) in the event of a failure so that a stand-alone version of the snapshot and file tiering management service 112 can be recovered to gain access to data (e.g., archived snapshots, files, etc.) stored in the cloud storage of the cloud infrastructure 128. The snapshot and file tiering management service 112 may provide a REST API for saving and downloading its configuration to facilitate such recovery in the event of failure of the storage array 106-1.

In some embodiments, the snapshot and file tiering management service 112 may not be implemented as a highly available component or clustered application. In such embodiments, the snapshot and file tiering management service 112 may rely on the storage array 106-1 to provide the infrastructure necessary for moving the snapshot and file tiering management service 112 between physical nodes within the storage array 106-1 (or to another one of the storage arrays 106-2 through 106-M) in the event of an outage.

The storage array 106-1, in some embodiments, provides mechanisms for the snapshot and file tiering management service 112 to deliver alerts, messages, log files, etc. The storage array 106-1 may also provide an interface through which support staff or other authorized users can interact with the snapshot and file tiering management service 112. This interface may be over a protocol such as the secure shell (SSH) protocol. The snapshot and file tiering management service 112 may have an independent installation and upgrade facility, such as via the storage array 106-1 upgrading individual software containers and VM components. A REST API may also be provided by the storage array 106-1 for installing and upgrading the snapshot and file tiering management service 112.

Various processing flows for snapshot and file tiering management will now described. Each of these processing flows may be initiated by a storage administrator, or other authorized user (e.g., of one of the host devices 102) with access to the snapshot and file tiering management service 112 of the storage array 106-1.

1) Protecting or Copying a Set of Snapshots for a Given LUN Group (e.g., a Cloud-Protected Snapshot Set) to Cloud Infrastructure 128:

The object of this process flow is a group of LUNs (which, as noted above, is an example of what is more generally referred to as a local storage volume), which may represent a consistency group, a storage group, etc. The process flow has the action of "protect," or copying the snapshots for the group of LUNs to the cloud infrastructure 128, which protects (e.g., backs up) and optionally frees up snapshot data on the local storage volumes of the storage array 106-1.

The process flow includes selecting a LUN group to protect or copy, and then setting up snapshot policies for the protect or copy operation. The snapshot policy may define snapshot filtering criteria (e.g., name, age, etc.), cloud destination in the cloud infrastructure 128 (e.g., selecting an existing cloud destination, adding a new cloud destination, etc.), retention period in the destination cloud (e.g., days, weeks, months, etc.), whether to use encryption (e.g., and, if so, the type of encryption to apply), whether to use compression (e.g., and, if so, the type of compression to apply), etc. Next, the user will define the schedule and frequency of performing the protect or copy operation for the selected LUN group. In some embodiments, the protect or copy operation for the selected LUN group may be run immediately. In other embodiments, the protect or copy operation may be scheduled for one or more future times, with include and exclude capability. The process flow may also include setting up notifications associated with the protect or copy operation for the selected LUN group. Notifications may be generated in response to various designated events or conditions, including but not limited to: on success of the protect or copy operation, on failure of the protect or copy operation, combinations thereof, etc. The user may also specify a notification method (e.g., none, email, alert, short message service (SMS), simple network management protocol (SNMP), secure remote services (ESRS), etc.).

The snapshot and file tiering management service 112 as part of this process flow may set up a job name (e.g., which may include or be associated with one or more of the selected LUN group, snapshot policy, a sequential number, etc.). The snapshot and file tiering management service 112 also enables authorized users to alter the job (e.g., the selected LUN group, policy, notification settings, etc.). In some embodiments, protect or copy operations may be applied to application groups, where an application group may include a group of LUNs.

2) Recovering a Set of Snapshots for a Given LUN Group (e.g., a Cloud-Protected Snapshot Set) from the Cloud Infrastructure 128:

The object of this process flow is a group of LUNs, which may represent a consistency group, a storage group, etc. The process flow has the action of "recovery," or copying the snapshots for the group of LUNs from the cloud infrastructure 128 to local storage volumes of the storage array 106-1. The recovery operation may be performed so as to recover data from an earlier point in time, repurpose data for testing and development, recover data in the event of a disaster or failure of the storage array 106-1, etc.

It should be appreciated that one or more snapshots may be "protected" or copied to the cloud infrastructure 128 from a first storage array (e.g., storage array 106-1) and "recovered" from the cloud infrastructure 128 to a second storage array (e.g., storage array 106-2) or to one or more of the host devices 102. It should also be appreciated that one or more snapshots may be "protected" or copied to the cloud infrastructure 128 from a first local storage volume (e.g., on one of the storage devices 108, such as storage device 108-1) of the storage array 106-1 and "recovered" from the cloud infrastructure 128 to a second local storage volume (e.g., on another one of the storage devices 108, such as storage device 108-2) of the storage array 106-1.

The recovery process flow includes selecting a LUN group to be recovered, and obtaining a list of the cloud protected snapshot sets for the selected LUN group. The list of the cloud protected snapshot sets may be ordered (e.g., in a chronological descending order), with associated tags if supported and available. The process continues with selecting one of the cloud protected snapshot sets for the selected LUN group, as well as a recovery target volume. In some embodiments, it is assumed that the recovery target volume is a "new" local storage volume of the storage array 106-1 (e.g., so as not to overwrite current data for the selected LUN group on the storage array 106-1). In other embodiments, however, the recovery target volume may be the original local storage volume of the storage array 106-1 (e.g., the source local storage volume from which the snapshots were copied in the first place) so as to facilitate recovery in the event of failure or disaster. As noted above, the recovery target volume may also be on a different one of the storage arrays 106 (e.g., one of storage arrays 106-2 through 106-M), on one of the host devices 102, etc.

Recovery of the selected cloud protected snapshot set for the selected LUN group is then initiated by creating a recovery job (e.g., including showing a running status or progress thereof). A status property of the local LUN group on the recovery target volume is set (e.g., to "Recovering from the cloud—in progress"). If the recovery job fails, a notification may be generated (e.g., via alert, email, SMS, ESRS, etc.) as desired in accordance with optional notification settings or policy for the recovery job. The notification may indicate the reason for failure and possible steps for fixing the issues. The notification may trigger remedial action for fixing the issues and for retrying the recovery job. If the recovery job succeeds, a notification may also be generated. Success of the recovery job may also be reflected visually in a job progress indicator of a graphical user interface (GUI) exposed by the snapshot and file tiering management service 112.

3) Managing Cloud Providers of the Cloud Infrastructure 128:

The object of this process flow is cloud provider containers (e.g., associated with clouds in the cloud infrastructure 128) utilized by the snapshot and file tiering management service 112. The process flow may have various actions, such as creating, viewing, editing, or deleting a cloud provider container. The cloud provider containers, as described above, may be used to store metadata used by the snapshot and file tiering management service 112 to establish cloud storage connections with various cloud service providers in the cloud infrastructure 128. This can advantageously avoid vendor lock-in. In this way, the snapshot and file tiering management service 112 can support various different private cloud and public cloud service providers.

4) Managing Cloud Protected Snapshot Sets:

The object of this process flow is a cloud protected snapshot set (e.g., for a given group of LUNs, such as a consistency group, a storage group, an application group, etc.). The process flow may have various actions, such viewing and deleting snapshots in the cloud protected snapshot set that are stored in the cloud infrastructure 128. Viewing snapshots may include selecting snapshots stored in the cloud infrastructure 128 for recovery as described above. The view action may be used to obtain a list of cloud snapshots and their associated properties, such as name, capacity, timestamp, expiration data, state (e.g., compression attributes, encryption attributes, etc.). Deleting snapshots may be utilized to manage cloud data footprint, comply with regulations, etc.

5) Managing Snapshot Policies:

The object of this process flow is snapshot policies (also referred to herein as snapshot shipping policies or cloud protection policies), and includes actions for creating, editing, and deleting snapshot policies, making snapshot policies read-only, etc. This process flow may be used to adjust snapshot retention and other characteristics over time. Creating a snapshot policy may include specifying a policy name and associated policy attributes, such as snapshot filtering criteria, cloud destination, retention period in the cloud, whether to use encryption (and, if so, what type of encryption to apply), whether to use compression (and, if so, what type of compression to apply), etc.

Editing a snapshot policy may include modifying the policy name or one or more of its associated policy attributes. In some embodiments, certain attributes may be locked (e.g., such as cloud destination, which may require special permission or access rights for a user to edit). Changes to a given snapshot policy will take effect the next time that a job runs which utilizes the given snapshot policy.

When the given snapshot policy runs for the first time (or some designated number of times) after being changed, a warning or notification may be generated informing users of how the changed snapshot policy will affect the job.

Deleting a snapshot policy, similar to changing certain policy attributes of a snapshot policy, may be restricted (e.g., require special permission or access rights from the requesting user). In some embodiments, a snapshot policy is not allowed to be deleted while in use by one or more protect or recovery jobs. When a snapshot policy is deleted, any mappings to existing or scheduled protect and recovery jobs should be cleaned.

6) Managing Cloud Protection Jobs:

The object of this process flow is a cloud protection job, and includes actions for creating a cloud protection job, deleting a cloud protection job, showing progress of a cloud protection job, cancelling a running cloud protection job, restarting a failed cloud protection job, pausing a cloud protection job, resuming a cloud protection job, etc. This process flow may be used for managing cloud protection jobs during or after data transfer completion. A cloud protection job includes a schedule (e.g., when the cloud protection job will be performed), a snapshot policy (e.g., what will be protected), and notification settings or policy. Managing cloud protection jobs may also include adding job names to cloud protection jobs (e.g., during first run, edited over time), indicating a start time and estimated time to finish, indicating bandwidth utilized, etc.

7) Viewing Dashboard:

The object of this process flow is cloud storage in the cloud infrastructure 128, and includes the action of viewing properties of the cloud storage. The properties of the cloud storage may include real-time throughput into and out of the storage array 106-1 to and from the cloud infrastructure 128, the approximate size of the cloud data (utilized by the snapshot and file tiering management service 112 for snapshots and file-level tiering) at rest, etc. In some embodiments, these properties or other information may be presented in the form of graphs showing: data ingress per LUN or group of LUNs, total (e.g., in 15 second samples for a 15 minute sliding window); data egress per LUN or group of LUNs, total (e.g., in 15 second samples for a 15 minute sliding window); size of data at rest per LUN or group of LUNs; total size of data per snapshot lineage; etc. Additional persistent or longer-term historical information may also be made available.

8) Snapshot Recovery in the Event of Site Disaster:

The object of this process flow is a cloud protected snapshot set, and includes the action of snapshot recovery to a "new" storage array (e.g., that was not the source of the cloud protected snapshot set). This process flow may be viewed as a more particular example of process flow 2 described above in a disaster scenario where the storage array that copied the cloud protected snapshot set to the cloud infrastructure 128 is "gone" or no longer available. In such a case, or more generally where a user wants to recover from a cloud protected snapshot set that resides at rest in the cloud storage of cloud infrastructure 128 to another storage array (or to one of host devices 102) using data movement tools to copy the data, access to the snapshot data in the cloud may be provided with a standalone instance of the snapshot and file tiering management service 112 (e.g., that is run external to the source storage array). The snapshot and file tiering management service 112, for example, may be run on a different storage array, on one of the host devices 102, etc. More generally, this process flow assumes that the snapshot and file tiering management service 112 runs in an "array-less" environment (e.g., not on the storage array that experienced the site disaster) to continue IT operations in the event of a datacenter or other site loss or unavailability.

A standalone instance of the snapshot and file tiering management service 112 is set up on some set of computing resources (e.g., as a recovery VM instance or software container). The recovery process (e.g., as described above in conjunction with process flow 2) is run, in which a configuration backup from the original instance of the snapshot and file tiering management service 112 embedded on the storage array experiencing site failure is used to seed the new standalone instance of the snapshot and file tiering management service 112. This enables the standalone instance of the snapshot and file tiering management service 112 to access the cloud storage of the cloud infrastructure 128 in which the snapshots are stored. From a user interface (e.g., a GUI) of the standalone instance of the snapshot and file tiering management service 112, a cloud snapshot LUN group is selected for recovery. A connection to a host (e.g., using iSCSI) is set up, and the selected cloud snapshot LUN group is mapped to that host through the user interface of the standalone instance of the snapshot and file tiering management service 112. The snapshots in the selected LUN group are discovered from the host, and any copy tools available on the host are used to move data to another storage array that is attached to or otherwise coupled or connected to the host.

Maintaining copies of snapshots on the storage arrays 106 may be more expensive than storing the snapshots on cloud storage in the cloud infrastructure 128. Thus, in some embodiments it is desired to move at least a subset of snapshots from local storage volumes of the storage arrays 106 to cloud storage in the cloud infrastructure 128. For example, snapshots containing "old" data that is no longer critical but is not permitted to be deleted (e.g., for compliance with regulations and policies) may be moved from the storage arrays 106 to the cloud infrastructure 128. Shipping snapshots to the cloud infrastructure 128, in addition to taking advantage of potentially lower cost cloud storage (e.g., as compared to local storage on the storage arrays 106), may be used to provide off-site storage for enhanced disaster recovery protection.

A "snapshot lineage" is a time-ordered sequence of snapshots (e.g., for one or more storage devices, one or more LUNs, one or more storage groups, one or more consistency groups, one or more application groups, etc.). Policy-based snapshot lineages in the cloud infrastructure 128 allow specific snapshots in a given snapshot lineage to be stored either in the originating storage array (e.g., storage array 106-1) or in cloud storage of the cloud infrastructure 128. For example, age-based policies may control movement of certain snapshots in the given snapshot lineage to the cloud storage of the cloud infrastructure 128. The snapshot and file tiering management service 112 enables on-demand retrieval of snapshots archived to the cloud infrastructure 128 (e.g., at the originating storage array 106-1, at a different one of the storage arrays 106, on one or more of the host devices 102, etc.).

In some embodiments, multiple policies may be applied to the storage array 106-1 or one or more local storage volumes thereof (or to one or more storage devices, one or more LUNs, one or more storage groups, one or more consistency groups, one or more application groups, etc. thereof). In such embodiments, multiple snapshot lineages can be maintained in a given cloud or across multiple clouds of the cloud infrastructure 128. FIG. 3, for example, illustrates three cloud snapshot lineages stored in cloud volumes 303-1, 303-2, and 303-3, respectively, for a single local snapshot lineage for local storage array volume 301.

Illustrative embodiments provide a storage array-independent mechanism for enhancing snapshots originating at a storage array (e.g., storage array 106-1), thus permitting the snapshots to be moved to a cloud storage system (e.g., cloud storage of one or more clouds in the cloud infrastructure 128). To do so, snapshot policies are created (e.g., by an administrator of the storage array 106-1 or other authorized user utilizing the snapshot and file tiering management service 112) to specify the frequency and under what conditions snapshots are to be generated at the storage array 106-1 and then subsequently moved to the cloud storage of the cloud infrastructure 128. For example, age-based policies may be specified for moving snapshots from the storage array 106-1 to the cloud storage of the cloud infrastructure 128.

When accessing snapshots in the lineage (e.g., via a user interface provided by an instance of the snapshot and file tiering management service 112), an array administrator or other authorized user is able to see all snapshots in the lineage, including which snapshots are local to the storage array 106-1 and which are stored in cloud storage of the cloud infrastructure 128.

A snapshot policy, as described above, may specify (in addition to the frequency and under what conditions snapshots are to be generated at the storage array 106-1 and then subsequently moved to the cloud storage of the cloud infrastructure 128), information such as the cloud destination, data compression and data encryption attributes for snapshot data stored in the cloud storage of cloud infrastructure 128, etc. Defining multiple snapshot policies for a single local storage volume (e.g., one or more storage devices, one or more LUNs, one or more consistency groups, one or more storage groups, one or more application groups, etc.) results in distinct snapshot lineages being created across multiple cloud volumes. The distinct snapshot lineages may be created across multiple cloud volumes associated with different clouds in the cloud infrastructure 128. Each of the distinct snapshot lineages may have different attributes or properties such as whether and what type of encryption to apply, whether and what type of compression to apply, the age at which snapshots should be moved from the storage array 106-1 to a particular cloud volume in one of the clouds of the cloud infrastructure 128, etc. It should also be noted that a single snapshot lineage may specify that snapshots are to be copied and mirrored to two distinct cloud volumes (e.g., for redundancy), possibly with the same age-based shipping, encryption and compression attributes.

FIG. 4 illustrates the SSMO module 114 providing a snapshot management interface 402, a snapshot policy management module 404, a snapshot lineage viewing module 406, a snapshot lineage size tracking module 408, an orphaned snapshot lineage identification module 410, an orphaned snapshot lineage management module 412, a snapshot checkpointing module 414, and a snapshot checkpointing cache 416. The snapshot management interface 402 may comprise a GUI or other type of user interface (e.g., through the SSH protocol) that permits authorized users (e.g., an administrator of storage array 106-1) utilizing one or more the host devices 102 to access various functionality of the snapshot and file tiering management service 112. Such access may include: creating, modifying and deleting snapshot policies utilizing the snapshot policy management module 404; viewing snapshot lineages and initiating snapshot shipping and recovery of snapshots thereof utilizing the snapshot lineage management module 406; viewing the size of snapshot lineages utilizing the snapshot lineage size tracking module 408; identifying and recovering orphaned snapshot lineages utilizing the orphaned snapshot lineage identification module 410 and orphaned snapshot lineage management module 412; pausing and resuming shipping of snapshots to cloud storage utilizing the snapshot checkpoint module 414 and snapshot checkpointing cache 416; etc.

The snapshot and file tiering management service 112 (e.g., the SSMO module 114 thereof) is configured to ship snapshots to cloud storage in a thin provisioned manner. That is, portions of snapshots in a snapshot lineage that share common data will share common objects in the cloud storage. The reduces cloud storage usage, as well as cloud data transfer costs. A storage administrator or other authorized user, however, may want to know how much cloud storage is being consumed by a given snapshot lineage. Accurately and persistently tracking cloud storage usage of thin provisioned cloud snapshots, however, is a challenging task. A single storage array (e.g., storage array 106-1) may include hundreds or thousands of storage devices 108 and associated snapshot lineages for subsets thereof (or for other logical storage volumes of the storage array 106-1). In addition to the sheer number of snapshot lineages whose sizes are to be tracked, the characteristics of the snapshot lineages (e.g., that they are thin provisioned, that some of the snapshot lineages may utilize compression, encryption or both, etc.) further complicate the task of tracking the size of the snapshot lineages in the cloud storage. Illustrative embodiments provide techniques for tracking the size of snapshot lineages in the cloud storage.

In some embodiments, the snapshot and file tiering management service 112 maintains a three-level tree structure in the cloud storage of cloud infrastructure 128 to represent a cloud volume. The first level includes the root of the tree and is referred to as a volume object. The root or volume object points to objects in the second level of the tree, also referred to as region objects. The region objects point to leaf nodes in the third level of the tree, also referred to as page objects.

Figure 5A:
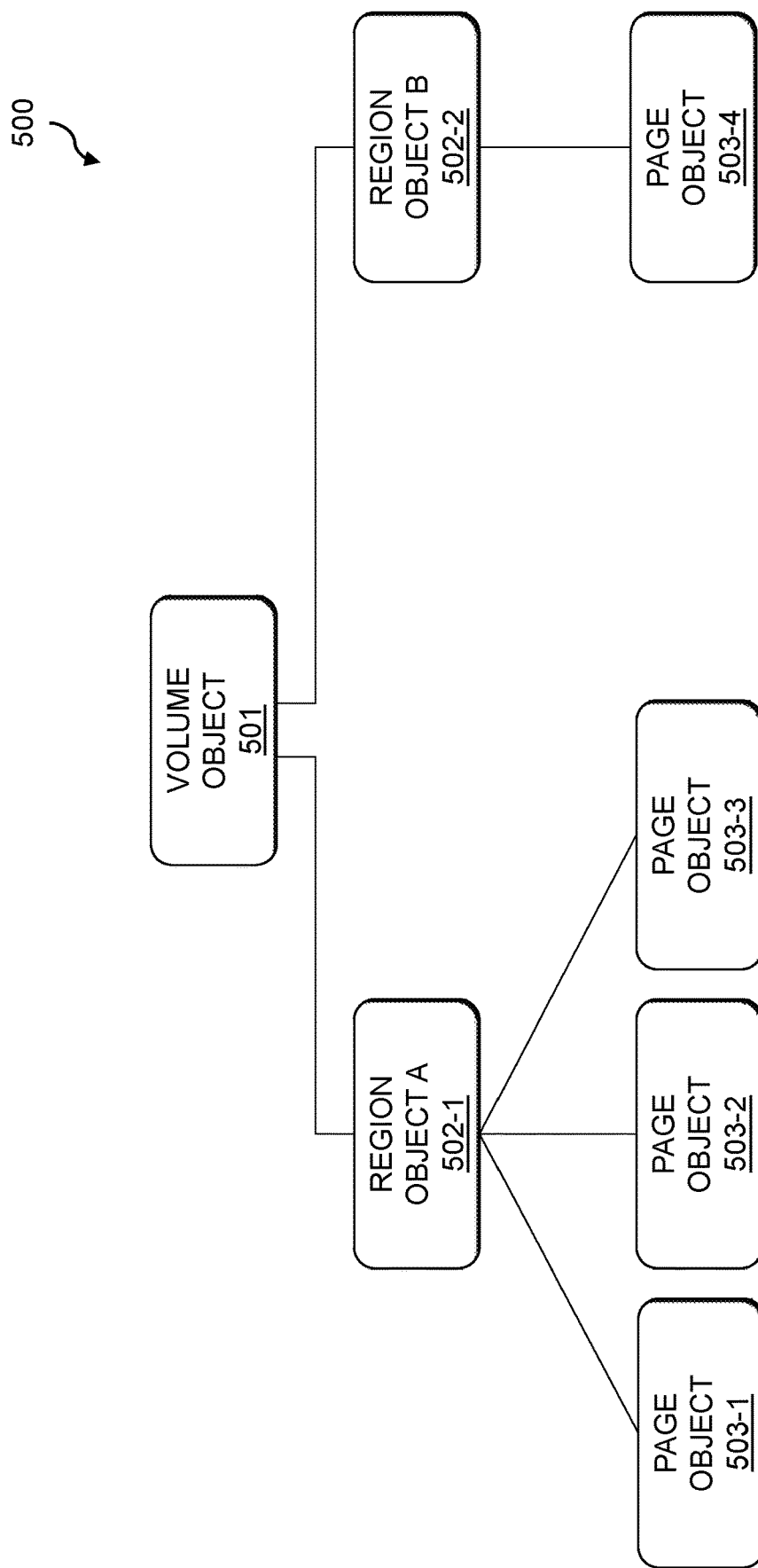
FIGS. 5A-5F illustrate examples of a multi-level tree structure maintained in cloud storage for a snapshot lineage in an illustrative embodiment.

FIG. 5A shows an example of a three-level tree structure 500, including a volume object 501 in the first level, two region objects 502-1 and 502-2 (also referred to as region objects A and B, respectively) in the second level, and a number of page objects 503-1, 503-2, 503-3 and 503-4 in the third level. As illustrated, the volume object 501 points to region object 502-1 and region object 502-2. The region object 502-1 points to page object 503-1, page object 503-2, and page object 503-3. The region object 502-2 points to page object 503-4.

Figure 5B:
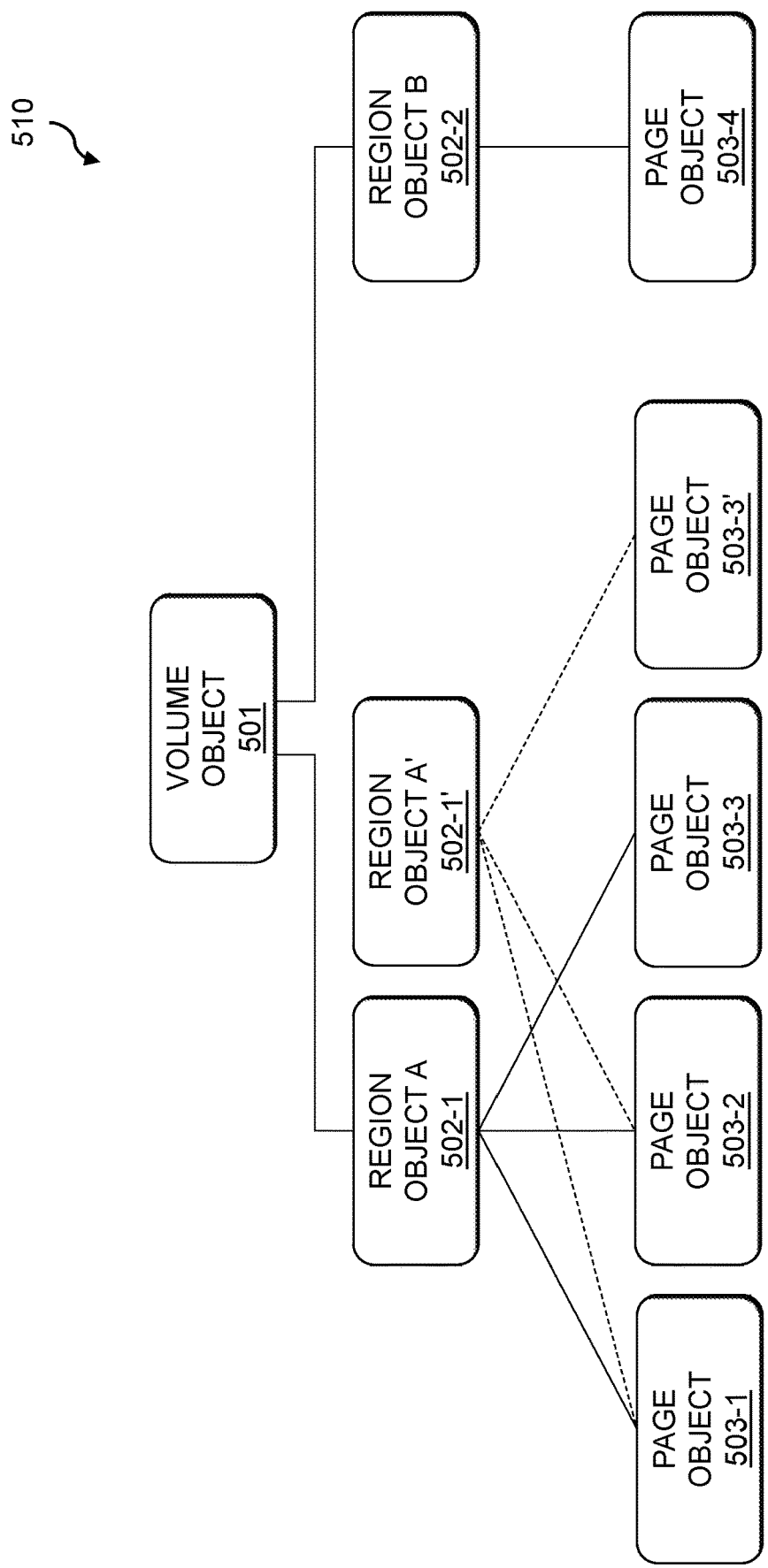

In the description below, it is assumed that the three-level tree structure 500 shown in FIG. 5A represents the current state of the layout in the cloud storage of cloud infrastructure 128 for a particular snapshot lineage, and that the snapshot and file tiering management service 112 is about to write a new version of page object 503-3 to the cloud. FIG. 5B shows the three-level tree structure 510 after the new version of page object 503-3 (e.g., page object 503-3' is written to the cloud). As illustrated, two new objects are created in the cloud storage and added to the three-level tree structure 510—a new page object 503-3', and a new region object A' 502-1'. The new region object A' 502-1' points to page object 503-1, page object 503-2, and page object 503-3'. It should be noted that the pointers from region object A' 502-1' are shown in dashed outline for clarity to distinguish from the pointers from region object A 502-1 which are shown in solid line.

Figure 5C:
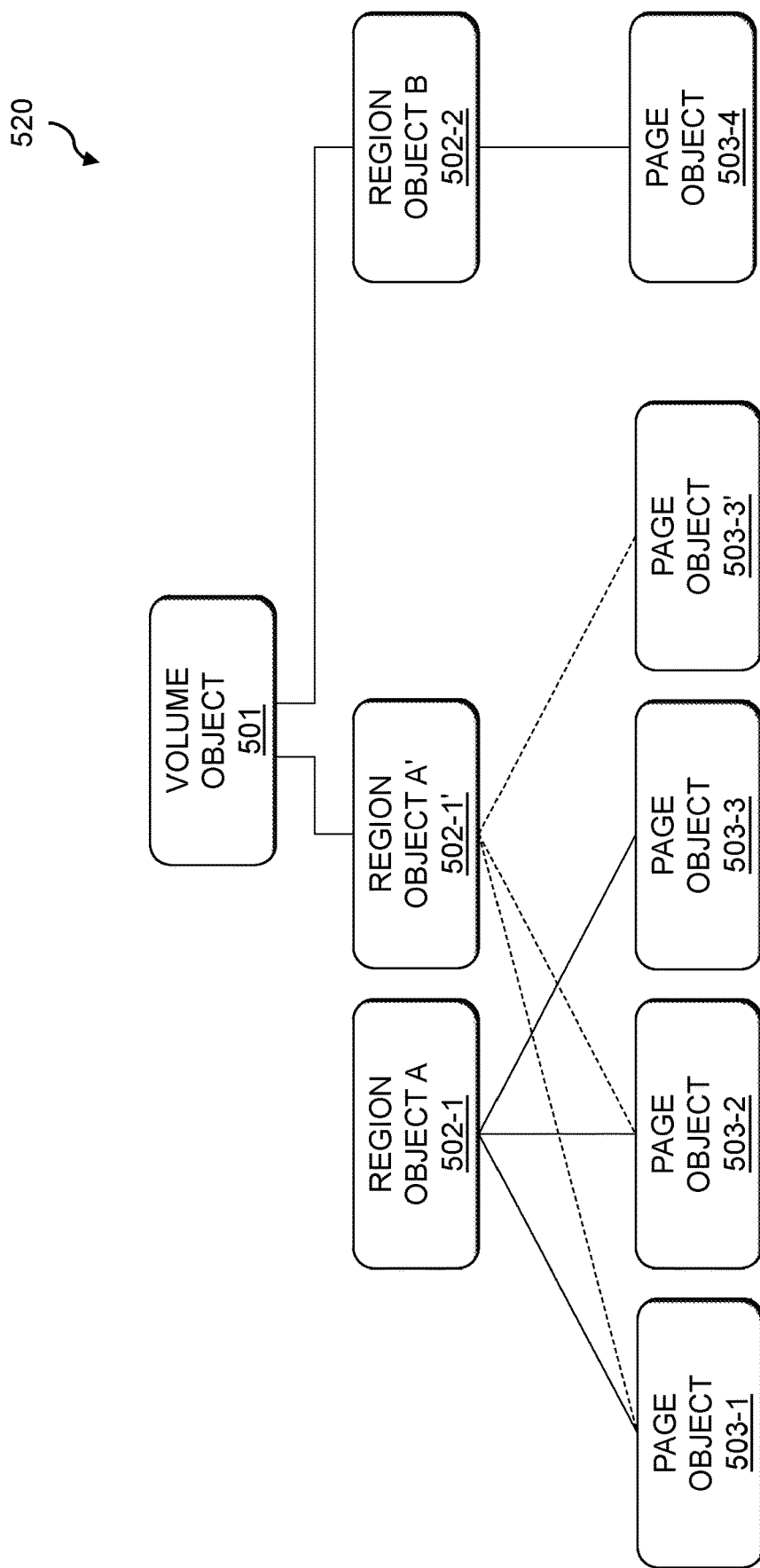
Figure 5D:
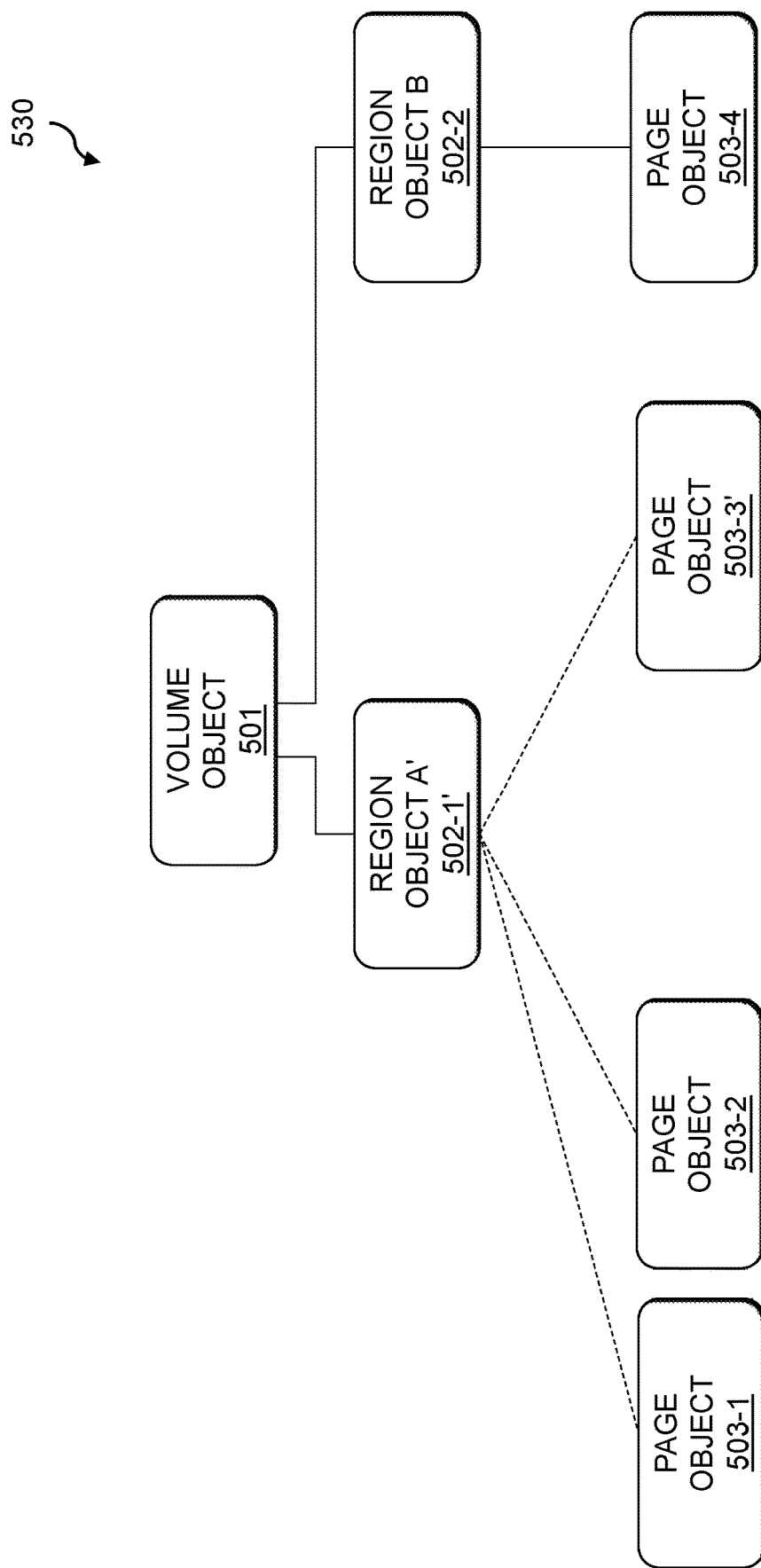

The next step in replicating or writing the new version of page object 503-3 (e.g., page object 503-3') to the cloud is to overwrite the volume object 501 to point to the new region object A' 502-1' and the region object B 502-2. This is called the "commit" and is illustrated in the three-level tree structure 520 of FIG. 5C. The "old" region object A 502-1 and page object 503-3 may then be deleted from the cloud. This is illustrated in the three-level tree structure 530 of FIG. 5D.

Figure 5E:
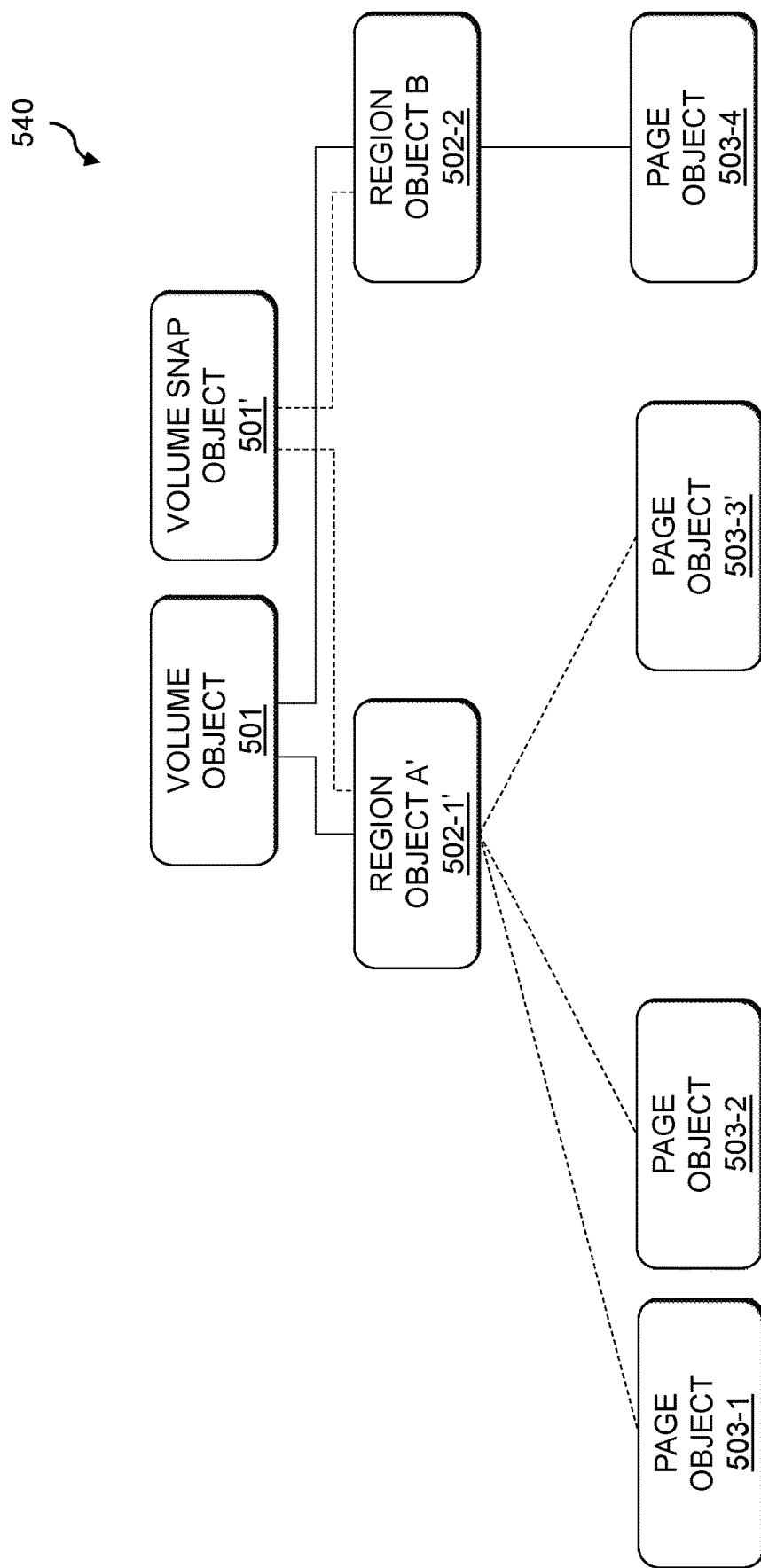

FIG. 5E shows the three-level tree structure 540 after creating a snapshot of the volume object 501. As illustrated, a new volume snapshot object 501' is created, which is a copy of the primary volume object 501. The pointers from the volume snapshot object 501' (also referred to herein as volume snap object 501') to the region object A' 502-1' and region object B 502-2 are shown in dashed outline for clarity to distinguish from the pointers from the primary volume object 501 to the region object A' 502-1' and region object B 502-2 which are shown in solid line.

Figure 5F:
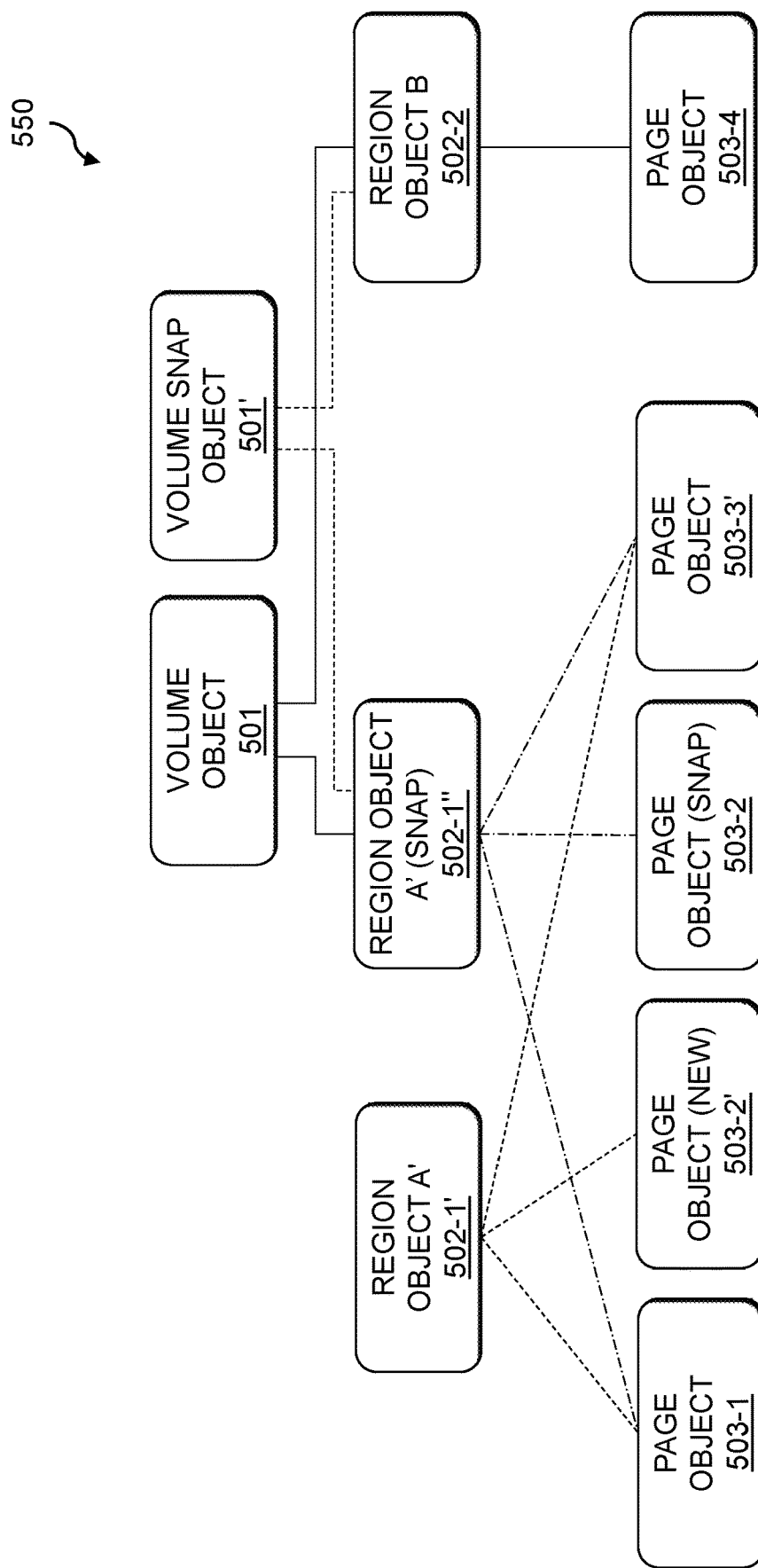

On a subsequent "flush" to the primary volume, the cleanup of objects in the cloud will have to take into account references by the snapshot (e.g., volume snap object 501') to assure that objects needed by the snapshot are not deleted. FIG. 5F shows the three-level tree structure 550 after a flush of the primary volume. In the FIG. 5F example, the flush of the primary volume includes update of the page object 503-2. The region object A' 502-1' thus points to page object 503-1, new page object 503-2' and page object 503-3'. As a snapshot was created (e.g., represented by volume snap object 501'), the "old" page object 503-2 needs to be retained for snapshot region object A' 502-1", which points to page object 503-1, the page object 503-2, and page object 503-3'.

In some embodiments, the snapshot and file tiering management service 112 provides functionality through the snapshot lineage size tracking module 408 for tracking the size of all objects shared and unique across the primary volume and all descendant snapshots of a given snapshot lineage. The snapshot lineage size tracking module 408 is configured to store the size of a given snapshot lineage in snapshot lineage size metadata that is stored locally (e.g., at an instance of the snapshot and file tiering management service 112) as well as persistently in the cloud storage as part of the primary volume object (e.g., volume object 501 in FIGS. 5A-5F). In some embodiments, the size of the given snapshot lineage is stored in the primary volume object (e.g., volume object 501 in FIGS. 5A-5F) but not the snapshot volume objects (e.g., snapshot volume object 501' in FIGS. 5E and 5F). The snapshot lineage size tracking module 408 is also configured to update the size value for a given snapshot lineage as part of the atomic commit process described above. The snapshot lineage size tracking module 408 is further configured to track replaced objects that may be garbage collected to reduce storage utilization.

Time-ordered snapshot lineages originating from the storage array 106-1 may be shipped to cloud storage of the cloud infrastructure 128 using virtualization software running on the storage array 106-1. The virtualization software, in some embodiments, comprises the snapshot and file tiering management service 112 running on the storage array 106-1. The originating storage array 106-1 has access to the snapshots stored in the cloud infrastructure 128 via the snapshot and file tiering management service 112 (e.g., via the snapshot management interface 402 of SSMO module 114 described above in conjunction with FIG. 4). Such access includes, but is not limited to, viewing snapshot lineages stored in the cloud infrastructure 128, managing the snapshot lineages stored in the cloud infrastructure 128 (e.g., viewing the snapshot lineages and associated information or metadata, selecting snapshots or an entire snapshot lineage to delete, selecting snapshots in a snapshot lineage to recover to the originating storage array 106-1, to one or more other ones of the storage arrays 106-2 through 106-M, to one or more of the host devices 102, etc.).

The cloud-based snapshot lineages can also be accessed by "other" storage arrays (e.g., ones of the storage arrays 106-2 through 106-M different than the originating storage array 106-1 for a particular snapshot lineage). To do so, configuration data (e.g., for at least a portion of the instance of the snapshot and file tiering management service 112 running on the storage array 106-1) is shared with such other storage arrays. The snapshot and file tiering management service 112 may provide an interface that permits a storage administrator or other authorized user to save and export such configuration data as desired (e.g., to one or more of the storage arrays 106-2 through 106-M, to one or more of the host devices 102, etc.). Advantageously, any compute platform that runs an instance of the virtualization software (e.g., an instance of the snapshot and file tiering management service 112) may be enabled to access cloud-based snapshot lineages from the originating storage array 106-1, provided that the originating storage array 106-1 makes the appropriate configuration data available to the compute platform. As a result, illustrative embodiments enable multiple access points from multiple compute platforms (e.g., multiple ones of the storage arrays 106 and/or host devices 102) to the same snapshot lineage stored in the cloud infrastructure 128. These access points can each copy or recover individual snapshots in the snapshot lineage as desired. Such techniques, in addition to permitting sharing of access to cloud-based snapshot lineages, can also be used to "move" access from one compute platform to another.

Moving access may be used to transfer "ownership" or control of a given cloud-based snapshot lineage. In some embodiments, only a single compute platform can own the given cloud-based snapshot lineage, where ownership of the given cloud-based snapshot lineage provides the ability to ship new snapshots to the given cloud-based snapshot lineage, to delete the given cloud-based snapshot lineage or snapshots thereof, to modify snapshot policies associated with the given cloud-based snapshot lineage, etc. In embodiments which assume that a single compute platform owns the given cloud-based snapshot lineage, multiple access points to the given cloud-based snapshot lineage are permissible (e.g., multiple compute platforms may view and copy snapshots from the given cloud-based snapshot lineage). It should further be noted that in some embodiments ownership of a given cloud-based snapshot lineage may be shared among two or more compute platforms.

Illustrative embodiments enable an originating storage array 106-1 to provide access, to a cloud-based snapshot lineage, to another one of the storage arrays (e.g., storage array 106-2), such as for testing and development purposes. For example, in the description below the originating storage array 106-1 may be referred to as a "production" storage array 106-1, with the storage array 106-2 being referred to as a testing or "development" storage array 106-2. The production storage array 106-1 may be more expensive to operate than the development storage array 106-2. The ability to provide access by the less expensive development storage array 106-2 to snapshot lineages stored in the cloud storage of the cloud infrastructure 128 enables testing and development on a pre-determined production data set from the more expensive production storage array 106-1. Similarly, providing access to one or more of the host devices 102 (e.g., which may be implemented as cloud compute platforms without an associated storage array) can also support the use case of testing and development.

FIG. 6 illustrates a process flow for providing inter-array access to a cloud-based snapshot lineage. This process flow assumes that both the storage array 106-1 (where the cloud-based snapshot lineage originated from) and the storage array 106-2 (where the cloud-based snapshot lineage will be accessed) run an instance of virtualization software configured to access and interpret the snapshot lineage residing in the cloud storage of the cloud infrastructure 128. Such virtualization software is further assumed to comprise an instance of the snapshot and file tiering management service 112 described elsewhere herein, or a portion thereof such as SSMO module 114. References below to the storage array 106-1 or the storage array 106-2 performing certain actions in the context of the FIG. 6 process flow should be understood to refer to utilizing an instance of the snapshot and file tiering management service 112 running thereon.

The process flow begins in step 601, with the storage array 106-1 (e.g., an instance of the snapshot and file tiering management service 112 running thereon) selecting a snapshot lineage that has been shipped from the storage array 106-1 to cloud storage of the cloud infrastructure 128. In step 602, the storage array 106-1 exports an "envelope" to the storage array 106-2, where the envelope comprises a subset of the configuration data (e.g., of the virtualization software running thereon, such as an instance of the snapshot and file tiering management service 112) that is required to access the snapshot lineage selected in step 601. The "envelope" may comprise the following information:

(a) A cloud identifier that points to the cloud storage (e.g., a cloud object storage) in the cloud infrastructure 128 where the selected snapshot lineage resides;

(b) A name of the bucket of the cloud object storage where the selected snapshot lineage resides in the cloud storage;

(c) Credentials used to access the cloud object storage where the selected snapshot lineage resides;

(d) Local configuration data describing the cloud volume and cloud snapshots in the selected snapshot lineage residing in the cloud object storage, which may include one or more of a volume identifier (ID), a volume name, and a volume file name residing in the cloud storage, and, for each snapshot in the selected snapshot lineage, one or more of a snapshot ID, a snapshot name, and a snapshot file name residing in the cloud storage;

(e) An indicator as to whether or not the selected snapshot lineage has encryption applied and, if so, encryption keys associated with the selected snapshot lineage or other encryption information required for decrypting encrypted snapshots in the selected snapshot lineage; and (f) An indicator as to whether or not the selected snapshot lineage has been compressed and, if so, any compression information used for de-compressing compressed snapshots in the selected snapshot lineage.

The envelope sent in step 602 may be packaged as a byte stream, an encrypted file, etc.

In step 603, the storage array 106-2 imports the envelope into virtualization software running on the storage array 106-2 (e.g., an instance of the snapshot and file tiering management service 112 running on the storage array 106-2). The virtualization software on the storage array 106-2 may expose an API that facilitates importing the envelope. The virtualization software on the storage array 106-2 un-packages the envelope and reconciles whether or not any of the information contained therein is already available in the virtualization software on the storage array 106-2. Any information deemed duplicate (e.g., already available in the virtualization software on the storage array 106-2) may be skipped. Once imported, the virtualization software on the storage array 106-2 deems the selected snapshot lineage as "orphaned" since the original storage volume it came from belongs to another array (e.g., to storage array 106-1). A storage administrator or other authorized user of the storage array 106-2 utilizes the virtualization software on the storage array 106-2 to access the selected snapshot lineage in the cloud infrastructure 128 in step 604 (e.g., using a normal course of accessing orphaned cloud snapshots as described elsewhere herein).

While FIG. 6 illustrates the process flow for providing inter-array access to a cloud-based snapshot lineage, FIG. 7 illustrates a process flow for providing array-to-compute platform access to a cloud-based snapshot lineage. This process flow assumes that both the storage array 106-1 (where the cloud-based snapshot lineage originated from) and a host device 102-1 (where the cloud-based snapshot lineage will be accessed) run an instance of virtualization software configured to access and interpret the snapshot lineage residing in the cloud storage of the cloud infrastructure 128. Such virtualization software is further assumed to comprise an instance of the snapshot and file tiering management service 112 described elsewhere herein, or a portion thereof such as SSMO module 114. References below to the storage array 106-1 or the host device 102-1 performing certain actions in the context of the FIG. 7 process flow should be understood to refer to utilizing an instance of the snapshot and file tiering management service 112 running thereon. It should also be appreciated that the host device 102-1 is an example of what is more generally referred to herein as a compute platform, and may provide or be associated with a cloud compute platform in some embodiments.

The steps 701 through 704 of the FIG. 7 process flow are similar to steps 601 through 604 of the FIG. 6 process flow (e.g., where in the FIG. 7 process flow, the host device 102-1 performs actions of the storage array 106-2 in the FIG. 6 process flow). The process flow begins in step 701, with the storage array 106-1 (e.g., an instance of the snapshot and file tiering management service 112 running thereon) selecting a snapshot lineage that has been shipped from the storage array 106-1 to cloud storage of the cloud infrastructure 128. In step 702, the storage array 106-1 exports an envelope to the host device 102-1, the envelope comprising a subset of the configuration data (e.g., of the virtualization software running thereon, such as an instance of the snapshot and file tiering management service 112) that is required to access the snapshot lineage selected in step 501. The envelope exported in step 702 may comprise similar information as the envelope exported in step 602 in the FIG. 6 process flow. The envelope sent in step 702 may be packaged as a byte stream, an encrypted file, etc.

In step 703, the host device 102-1 imports the envelope into virtualization software running on the host device 102-1 (e.g., an instance of the snapshot and file tiering management service 112 running on the host device 102-1). The virtualization software on the host device 102-1 may expose an API that facilitates importing the envelope. The virtualization software on the host device 102-1 un-packages the envelope and reconciles whether or not any of the information contained therein is already available in the virtualization software on the host device 102-1. Any information deemed duplicate (e.g., already available in the virtualization software on the host device 102-1) may be skipped. A storage administrator or other authorized user of the host device 102-1 utilizes the virtualization software on the host device 102-1 to access the selected snapshot lineage in the cloud infrastructure 128 in step 704 (e.g., using a normal course of accessing cloud snapshots as described elsewhere herein).

Once a snapshot has been shipped from the storage array 106-1 to cloud storage of the cloud infrastructure 128, a local copy of that snapshot stored on the storage array 106-1 can be removed from the storage array 106-1 since there is a copy of that snapshot stored in the cloud storage. Even in cases where the local storage volume of the storage array 106-1 from which the local snapshots in a given snapshot lineage were taken is removed, and where all of the local snapshots for the given snapshot lineage stored on the storage array 106-1 are deleted, copies of such snapshots are stored in the cloud storage of cloud infrastructure 128. Such "orphaned" snapshot lineages are still accessible to the storage array 106-1 via the snapshot and file tiering management service 112 (e.g., utilizing the orphaned snapshot lineage identification module 410 and orphaned snapshot lineage management module 412 of the SSMO module 114 shown in FIG. 4).

Illustrative embodiments provide techniques for accessing orphaned snapshot lineages stored in cloud storage. Retiring storage from an expensive storage array (e.g., storage array 106-1, which may be more expensive to operate and maintain than cloud storage of the cloud infrastructure 128) may, in some cases, still require copies of snapshot lineages or portions thereof to be maintained (e.g., for legal compliance purposes). Having readily available access to this retired storage in the cloud infrastructure 128 through the original storage array 106-1 can therefore be critical in cases where one or more snapshots of a snapshot lineage need to be brought back or otherwise recovered to the original storage array 106-1 (or to one or more other storage arrays, such as one or more of storage arrays 106-2 through 106-M, or to one or more compute platforms, such as one or more of the host devices 102).

A snapshot lineage stored in the cloud storage of the cloud infrastructure 128 (e.g., cloud-based object storage) without a local array volume tied to it on the originating storage array 106-1 is referred to as an "orphaned" snapshot lineage. Illustrative embodiments enable the originating storage array 106-1 (or one or more other ones of the storage arrays 106-2 through 106-M, or one or more of the host devices 102) to address or otherwise access orphaned snapshot lineages through virtualization software running thereon (e.g., an instance of the snapshot and file tiering management service 112) even if all of the local storage of the storage array 106-1 from which the snapshot lineage originated has been removed.

The virtualization software running on the storage array 106-1 (e.g., the snapshot and file tiering management service 112) performs shipping or copying of local snapshots stored on local storage volumes of the storage array 106-1 to cloud object storage of the cloud infrastructure 128. The virtualization software is also configured to keep track of the descendant volumes from which the snapshot lineage originated in its configuration data. The storage array 106-1 can query the configuration data through an API for snapshot lineages that no longer have a parent array volume on the storage array 106-1. This allows the storage array 106-1 to display orphaned snapshot lineages, and to choose individual snapshots that reside in cloud storage of the cloud infrastructure 128 for recovery to local storage volumes of the storage array 106-1.

As noted above, orphaned snapshot lineages refer to snapshot lineages stored in the cloud storage of cloud infrastructure 128 that are no longer tied to a local storage volume of the storage array 106-1. For such orphaned snapshot lineages, only the virtualization software (e.g., the snapshot and file tiering management service 112) may know about the snapshots in the orphaned snapshot lineages (e.g., the storage array 106-1 may not be aware of or otherwise know that the orphaned snapshot lineages exist or are otherwise available). In such cases, the data and knowledge about the orphaned snapshot lineages has been moved to the snapshot and file tiering management service 112.

The snapshot management interface 402 of the SSMO module 114 illustrated in FIG. 4 permits authorized users (e.g., an administrator of storage array 106-1) utilizing one or more the host devices 102 to query and identify configuration data of the snapshot and file tiering management service 112 via the orphaned snapshot lineage identification module 410. In this way, snapshot lineages that no longer have a local storage volume on the storage array 106-1 may be identified. The authorized user can then utilize the snapshot management interface 402 to recover snapshots in the orphaned snapshot lineage using the orphaned snapshot lineage management module 412.

Storing a large number of snapshots locally in a storage array (e.g., storage array 106-1) can limit resources over time. Thus, illustrative embodiments provide techniques for automatically shipping snapshots from storage array 106-1 to cloud storage in the cloud infrastructure 128. After a snapshot has been successfully shipped or copied from the storage array 106-1 to the cloud storage in the cloud infrastructure 128, that snapshot may be deleted from the storage array 106-1. The shipped snapshot stored in the cloud infrastructure 128 may later be recovered as described elsewhere herein.

A cloud tiering appliance (CTA) that runs in or is otherwise associated with the cloud infrastructure 128 may manage snapshot shipping from storage arrays such as storage array 106-1. Policies may be created on the CTA (rather than on the storage array 106-1 using snapshot and file tiering management service 112), and such policies may be run periodically to check for any snapshots on the storage array 106-1 that match search criteria provided in the CTA-defined policy. On detecting a match, the CTA creates an object in cloud storage, and writes the blocks from the storage array 106-1 to the cloud storage (e.g., like a tape archive). Once all the blocks are written, the object is closed. The closed object represents the snapshot on the storage array 106-1. The CTA also creates a metadata object associated with the closed object, where the metadata object created in the cloud storage represents an (offset, length) tuple read from the storage array 106-1. An object pair is created in the cloud storage for each snapshot that is copied from the storage array 106-1. The use of a CTA for snapshot shipping, however, has various drawbacks. For example, there may be no way to visualize data written to the cloud. As another example, during recovery, a base snapshot must be recovered first, followed by incrementally recovering subsequent snapshots until reaching the desired snapshot to be recovered. To overcome these and other disadvantages, illustrative embodiments manage snapshot shipping at the storage array 106-1 utilizing the snapshot and file tiering management service 112.

Snapshot polices of the snapshot and file tiering management service 112 (e.g., the SSMO module 114 thereof) define the cloud destination for local snapshots that are to be copied or shipped to cloud storage in the cloud infrastructure 128. The snapshot policies may also specify retention time on the cloud (e.g., how long shipped snapshots should be stored on the cloud storage of the cloud infrastructure 128). The storage array 106-1 exposes an API (e.g., the snapshot ready to archive API described above, also referred to as a GET_CLOUD_SNAPSHOTS REST API) that provides details about snapshots to be shipped to cloud storage of the cloud infrastructure 128. As described above, the snapshot and file tiering management service 112 may periodically call the snapshot ready to archive API to check for snapshots to be shipped to cloud storage of the cloud infrastructure 128.

Once the snapshot and file tiering management service 112 identifies a snapshot to be shipped to the cloud storage of the cloud infrastructure 128, the snapshot and file tiering management service 112 calls another API (e.g., the snapshot preparation API described above, also referred to herein as a PREPARE REST API) that exposes the snapshot as a "device" to be read (e.g., a virtually provisioned device, also referred to herein as a thin device (TDEV)).

The snapshot and file tiering management service 112 then calls another API (e.g., the snapshot differential API described above, also referred to herein as a SNAPSHOT_BITMAP REST API) to get the blocks that contain the actual data to be shipped. The snapshot differential API checks if there is a previous (e.g., n−1) snapshot for a given volume and, if so, gets a delta between the previous snapshot and the current (e.g., n) snapshot. The snapshot and file tiering management service 112 will advantageously only copy those blocks representing the delta.

The snapshot and file tiering management service 112 creates a volume on the cloud storage (e.g., as defined in the associated snapshot policy), and then ships only the blocks representing the delta from the "device" exposed by the snapshot preparation API. Once shipping is completed, the snapshot and file tiering management service 112 calls another API (e.g., the snapshot cleanup API described above, also referred to herein as a CLEANUP REST API) on the snapshot. The snapshot cleanup API marks the current "n" snapshot being shipped to the cloud storage as processed. The snapshot cleanup API also determines if there is a previous "n−1" snapshot on the storage array 106-1. If so, and depending on the snapshot policy, the snapshot cleanup API may delete the previous "n−1" snapshot from the storage array 106-1. As a result of the above-described processing, a snapshot is created on a cloud volume in cloud storage of the cloud infrastructure 128 that corresponds to the current "n" snapshot shipped from the storage array 106-1. The current "n" snapshot will become the "n−1" snapshot for a next iteration.

Figure 8A:
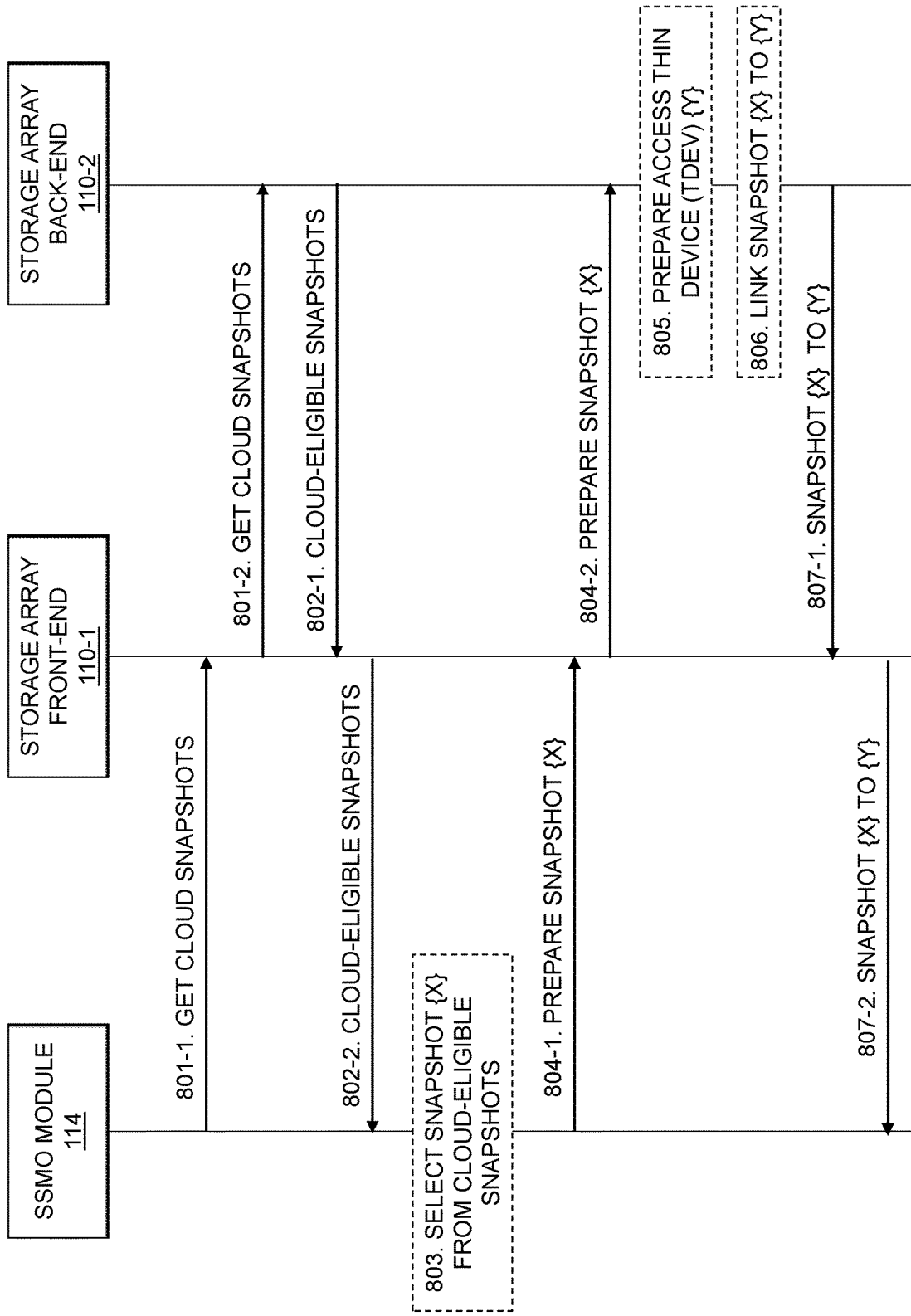
FIGS. 8A and 8B illustrate a process flow for snapshot shipping in an illustrative embodiment.
Figure 8B:
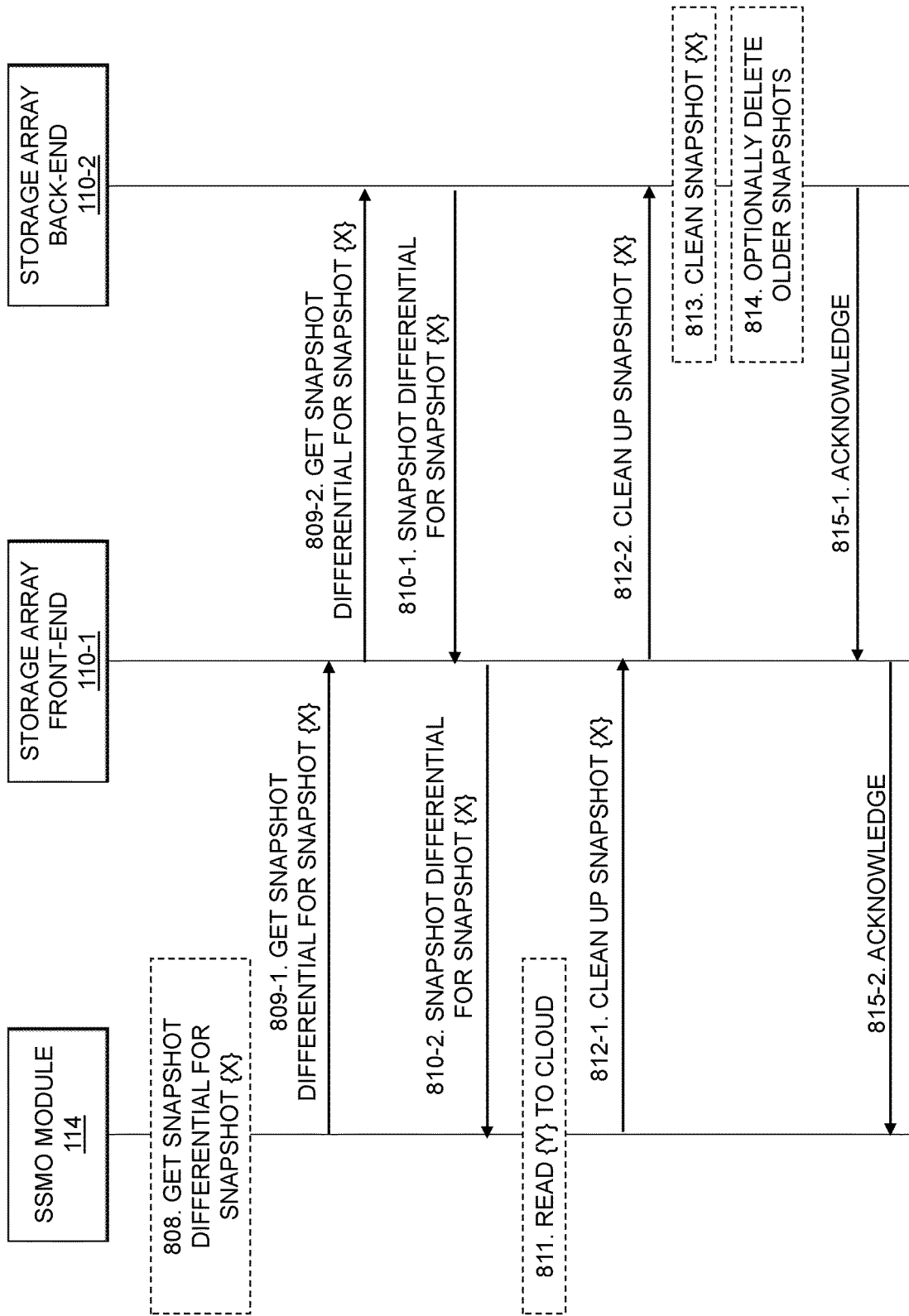

A process flow for snapshot shipping will now be described with respect to FIGS. 8A and 8B. FIGS. 8A and 8B show the SSMO module 114, which more generally represents the snapshot and file tiering management service 112, along with a storage array front-end 110-1 and storage array back-end 110-2. The storage array front-end 110-1 and storage array back-end 110-2 are assumed to be implemented by the storage controllers 110 of storage array 106-1. The storage array front-end 110-1 may be viewed as a REST API or other interface for the SSMO module 114 (or other modules of the snapshot and file tiering management service 112) to access internals of the storage array 106-1 (e.g., the storage array back-end 110-2). The process flow of FIGS. 8A and 8B begins in step 801-1, with the SSMO module 114 initiating a request for cloud snapshots to the storage array front-end 110-1. The storage array front-end 110-1 in step 801-2 forwards the request to the storage array back-end 110-2. In step 802-1, the storage array back-end 110-2 returns to the storage array front-end 110-1 the cloud-eligible snapshots. The storage array front-end 110-1 forwards this response to the SSMO module 114 in step 802-2.

Steps 801-1, 801-2, 802-1 and 802-2 may utilize the snapshot ready to archive or GET_CLOUD_SNAPSHOTS REST API. The GET_CLOUD_SNAPSHOTS REST API is used to get a list of objects, and includes a resource of "cloudsnapshot" and has a request type of "GET" with a description of "get unprocessed cloud-eligible snapshots." A uniform resource locator (URL) of the GET_CLOUD_SNAPSHOTS REST API may include a path parameter (e.g., of type string) that provides a unique identifier of the storage array 106-1, where this identifier is obtained from request parameters set in a registration API call of the snapshot and file tiering management service 112. The URL of the GET_CLOUD_SNAPSHOTS REST API may also include a query parameter (e.g., of type string) which is an optional value that filters the returned list of cloud-eligible snapshots so that the list displays only cloud-eligible snapshots with a specified storage group (SG) name.

The response to invoking the GET_CLOUD_SNAPSHOTS REST API is an object "ListCloudSnapshotResult" with an attribute name of "storage_group_cloud_snapshots" that has a type of array with object "CloudSnapshotResultType" and includes a list of the cloud snapshots.

The "CloudSnapshotResultType" object includes attributes: "storage_group_id(parentId)" having a type of string that provides the storage group universally unique identifier (UUID); "snapshot_id" with a type of long comprising a snapshot set ID tagged on all snapshots in the snapshot set; optional "datetime" with a type of long comprising a timestamp (e.g., a UNIX timestamp) representation for the snapshots, which should be the same for all snapshots in the snapshot set; "snapshots" with a type of "CloudSnapshotType" object comprising a list of cloud snapshot objects; "metadata" with a type of "Array[MetaDataObjectType]" comprising an associated metadata object (where the snapshot and file tiering management service 112 can use this object to pass the SG name if applicable—the SG name may also be passed as a standalone attribute of the "CloudSnapshotResultType" object); and "policy" with a type of "CloudPolicyType" object comprising the cloud policy object applied to the snapshots.

The "CloudSnapshotType" object includes attributes: "volume_identifier" with a type of "VolumeIdentifierType" object comprising a source volume name; "snapshot_size" with a type of long comprising the actual snapshot size (e.g., in bytes); and "metadata" with the type of "Array[MetaDataObjectType]" object comprising an associated metadata object (where the snapshot and file tiering management service 112 can use this object to pass the SG name if applicable—the SG name may also be passed as a standalone attribute of the "CloudSnapshotResultType" object).

The "VolumeIdentifierType" object includes attributes: "volume_id" of type string comprising the volume name; "wwn" of type string comprising the volume's external visible world wide name (WWN); and an optional "track_size" of type integer comprising the track size of the volume in bytes of the source device (e.g., a granularity of what 1 bit represents, such as 128 kilobytes for fixed-block architecture (FBA) devices).

The "MetaDataObjectType" object includes attributes: "key" of type string which comprises the object key; and "value" of type string that comprises the object value.

The "CloudPolicyType" object includes attributes: "cloud_provider_id" of type string comprising the ID of the selected cloud provider; "encryption" of type Boolean indicating whether encryption is required; "compression" of type Boolean indicating if compression is required; and "expiry_date" of type long comprising a timestamp (e.g., a UNIX timestamp) of when the snapshot is due to expire.

FIG. 9 shows a sample JavaScript Object Notation (JSON) response 900 to invoking the GET_CLOUD_SNAPSHOTS REST API. Response status codes for the JSON response 900 include: 200 OK, indicating a successful request; 401, returned if an incorrect username, password, or both are specified; 403, returned if the specified username and password are correct, but the user is not authorized to make the request; and 500, returned if a problem occurred when the system was retrieving the information.

Returning to FIG. 8A, the process flow continues with step 803 where the SSMO module 114 selects a snapshot (denoted X in FIG. 8A) from the list of cloud-eligible snapshots returned in step 802-2. The SSMO module 114 then sends a request to the storage array front-end 110-1 in step 804-1 to prepare the selected snapshot, which is forwarded to the storage array back-end 110-2 in step 804-2. The storage array back-end 110-2 in step 805 prepares a virtually provisioned device (denoted Y in FIG. 8A), also referred to as a thin device (TDEV). The storage array back-end 110-2 in step 806 links the selected snapshot to the TDEV (e.g., links snapshot {X} to {Y}). In step 807-1, the storage array back-end 110-2 provides to the storage array front-end 110-1 information indicating that the selected snapshot is linked to the TDEV, and the storage array front-end 110-1 in step 807-2 forwards this information to the SSMO module 114.

Steps 803 through 807 may include the SSMO module 114 invoking the PREPARE REST API. The PREPARE REST API is used to prepare a specific cloud snapshot, and includes the resource of "cloudsnapshot" and a request type of "POST" with a description of "prepare a specific cloud snapshot." A URL of the PREPARE REST API may include a path parameter (e.g., of type string) that provides the unique identifier of the storage array 106-1 (e.g., where this identifier is obtained from request parameters set in the registration API call of the snapshot and file tiering management service 112 as described above). Invoking the PREPARE REST API utilizes a request parameter object "CloudSnapshotInputParam" with attributes: "volume_id" of type string that comprises the volume name; and "snapshot_id" of type long that comprises the snapshot set ID.

The response to invoking the PREPARE REST API is synchronous and includes two objects "AccessVolumeIdentifierType" and "CloudSnapshotPrepareResultType." The "AccessVolumeIdentifierType" object includes the attribute "wwn" of type string comprising the volume external visible WWN. The "CloudSnapshotPrepareResultType" object includes attributes: "source_volume_track_size" of type long comprising the source volume track size; and "access_volume_identifier" of type "AccessVolumeIdentifierType" comprising the linked target volume identifiers. It should be noted that access TDEV read size can be retrieved from the response parameter "CloudSnapshotResultType.snapshots" attribute (e.g., CloudSnapshotType.VolumeIdentifierType.track_size of the list response "ListCloudSnapshotResult.").

FIG. 10 shows a sample JSON request 1000 for invoking the PREPARE REST API along with a sample JSON response 1010 to invoking the PREPARE REST API. Response status codes for the JSON response 1010 include: 201 Created, returned when the resource is created; 400, returned when an error occurs with the validation of the request payload (e.g., the <STORAGE_GROUP> parameter should be 1-64 alphanumeric, '_' or "-" characters); 401, returned if an incorrect username, password, or both are specified; 403, returned if the specified username and password are correct, but the user is not authorized to make the request; 404, returned if the requested resources (e.g., cloud system, cloud snapshot volume, cloud snapshot) cannot be found; and 500, returned if a problem occurs when the system executes the command.

Returning to FIG. 8B, the process continues with the SSMO module 114 getting a snapshot differential for the selected snapshot in step 808. In step 809-1 the SSMO module 114 sends a get request for the snapshot differential to the storage array front-end 110-1, which forwards the get request to the storage array back-end 110-2 in step 809-2. The storage array back-end 110-2 returns the snapshot differential for the selected snapshot to the storage array front-end 110-1 in step 810-1, and the storage array front-end 110-1 forwards the snapshot differential for the selected snapshot to the SSMO module 114 in step 810-2.

Steps 808 through 810 may include the SSMO module 114 invoking the SNAPSHOT_BITMAP REST API. The SNAPSHOT_BITMAP REST API is used to obtain the snapshot differential for a specific cloud snapshot, and includes the resource of "snapshotbitmap" and a request type of "POST" with a description of "gets the full or delta allocations for a specific snapshot." A URL of the SNAPSHOT_BITMAP REST API may include a path parameter (e.g., of type string) that provides the unique identifier of the storage array 106-1 (e.g., where this identifier is obtained from request parameters set in the registration API call of the snapshot and file tiering management service 112 as described above).

Invoking the SNAPSHOT_BITMAP REST API utilizes a request parameter object "SnapshotBitmapLookup" with attributes: "management_type" of type string enumerating the management entity comprising a specification of the management entity to be used (e.g., devices, storage group); optional "device_names" of type Array<String> comprising a list of devices for the bitmaps to be checked; optional "storage_group_name" of type string comprising the storage group for the bitmaps to be checked; "snapshot_id" of type long comprising a value identifying the snapshot, where if the selected snapshot is a service level snapshot then a snapshot set ID may be used, and if the selected snapshot is a manual snapshot then the generation number of the snapshot may be used; optional "snapshot_name" of type string that is used when the selected snapshot is a manual snapshot being checked, where the snapshot name is used in combination with the generation number to uniquely identify the selected snapshot; optional "previous_snapshot_id" of type long comprising an identifier a previous snapshot to compare for the bitmap, where the identifier may be a snapshot set ID or generation number, and where if this attribute is not specified this implies the allocation map; "start_track" of type integer comprising the starting track location of allocations for the selected snapshot if only one snapshot generation is given, or the starting track location for comparison between snapshots if two are given; and "track_count" of type integer comprising the total number of tracks from the "start_track" of allocations for the selected snapshot if only one snapshot generation is given (e.g., where the value is non-zero, and if set to null or not populated the allocations will continue until the last track of the device), or the total number of tracks from "start_track" for the comparison between the two specified snapshots if two are given (e.g., where the value is non-zero, and if set to null or not populated the comparison will continue until the last track of the device or snapshot).

The response to invoking the SNAPSHOT BITMAP REST API is synchronous and includes two objects "DeviceSnapshotBitmapList" and "DeviceSnapshotBitmap."

The "DeviceSnapshotBitmapList" object includes the optional attribute "bitmaps" with type of "Array<DeviceSnapshotBitmap>" comprising the bitmaps for devices.

The "DeviceSnapshotBitmap" object includes attributes: "device_name" of type string comprising the volume name for the snapshot; optional "snapshot_name" of type string comprising the snapshot name for the device; "snapshot_id" of type long comprising the snapshot ID number (e.g., snapshot set ID for a service level snapshot or generation for a manual snapshot) for the device; optional "previous_snapshot_id" of type long comprising the snapshot ID number being compared against (e.g., snapshot set ID for service level snapshot or generation for a manual snapshot) for the device; "count" of type long comprising the address of a variable that represents the size of the array in bytes returned in the bitmap; and "bitmap" of type "base64Binary" comprising the address of a pointer to an unsigned character array where the track bitmap is returned.

FIG. 11 shows a sample JSON request 1100 for invoking the SNAPSHOT_BITMAP REST API along with a sample JSON response 1110 to invoking the SNAPSHOT_BITMAP REST API. Response status codes for the JSON response 1110 include: 200 OK; 400, returned when an error occurs with the validation of the request payload (e.g., the <STORAGE_GROUP> parameter should be 1-64 alphanumeric, '_' or "-" characters); 401, returned if an incorrect username, password, or both are specified; 403, returned if the specified username and password are correct, but the user is not authorized to make the request; 404, returned if the requested resources (e.g., cloud system, cloud snapshot volume, cloud snapshot) cannot be found; 406, returned if the requested resource for the previous cloud snapshot cannot be found; and 500, returned if a problem occurs when the system executes the command.

Returning to FIG. 8B, the process continues with step 811, where the SSMO module 114 reads (e.g., ships or copies) the TDEV to the cloud infrastructure 128. Following step 811, the SSMO module 114 sends a request to the storage array front-end 110-1 to clean up the selected snapshot in step 812-1, and the storage array front-end 110-1 forwards the request to the storage array back-end 110-2 in step 812-2. In step 813, the storage array back-end 110-2 cleans the selected snapshot. In step 814, the storage array back-end 110-2 optionally deletes older snapshots. The storage array back-end 110-2 provides an acknowledgement (e.g., of the snapshot clean-up) to the storage array 110-1 in step 815-1, and the storage array front-end 110-1 forwards the acknowledgement to the SSMO module 114 in step 815-2.

Steps 811 through 815 may include the SSMO MODULE 114 invoking the CLEANUP REST API. The CLEANUP REST API is used to clean up data after shipping a snapshot to the cloud infrastructure 128, and includes the resource of "cloudsnapshot" and a request type of "POST" with a description of "cleans up after all the data has been processed for a specific cloud snapshot." A URL of the CLEANUP REST API may include a path parameter (e.g., of type string) that provides the unique identifier of the storage array 106-1 (e.g., where this identifier is obtained from request parameters set in the registration API call of the snapshot and file tiering management service 112 as described above).

Invoking the CLEANUP REST API utilizes a request parameter object "CleanupSnapshotParam" with attributes: "cloud_snapshot" of type "CloudSnapshotInputParam" comprising the cloud snapshot details to be unlinked; optional "delete_cloud_snapshot" of type "CloudSnapshotInputParam" that comprises details of the cloud snapshots to be deleted (e.g., the same snapshot given in the "previous_cloud_snapshot" attribute described above with respect to determining the snapshot differential); and optional "type" enumerating COMMIT or CANCEL specifying the type of clean up that will be performed (e.g., COMMIT may be selected by default). The response to the CLEANUP REST API is synchronous, and includes no content.

Figure 12:
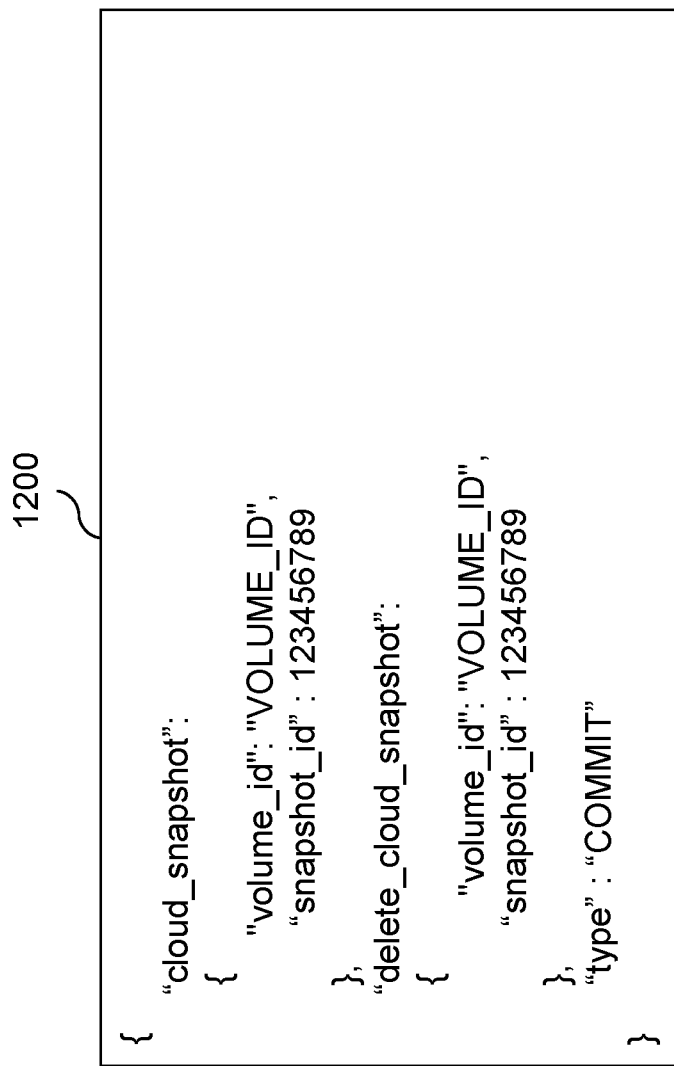
FIG. 12 shows pseudocode for a request to invoke a snapshot cleanup application programming interface in an illustrative embodiment.

FIG. 12 shows a sample JSON request 1200 for invoking the CLEANUP REST API. Response status codes for the JSON response include: 204, No Content, returned when the resource is cleaned up or deleted successfully; 400, returned when an error occurs with the validation of the request payload (e.g., the <STORAGE_GROUP> parameter should be 1-64 alphanumeric, '_' or "-" characters); 401, returned if an incorrect username, password, or both are specified; 403, returned if the specified username and password are correct, but the user is not authorized to make the request; 404, returned if the requested resources (e.g., cloud system, cloud snapshot volume, cloud snapshot, delete cloud snapshot volume, delete cloud snapshot) cannot be found; and 500, returned if a problem occurs when the system executes the command.

As noted above, storing a large number of snapshots locally in a storage array (e.g., storage array 106-1) can limit resources over time, and thus snapshots may be shipped from storage array 106-1 to cloud storage in the cloud infrastructure 128. The shipped snapshots stored in the cloud infrastructure 128 may later be recovered. As further noted above, the use of a CTA for snapshot shipping and recovery has various drawbacks. For example, there may be no way to visualize data written to the cloud. As another example, during recovery, a base snapshot must be recovered first, followed by incrementally recovering subsequent snapshots until reaching the desired snapshot to be recovered. The CTA utilizes a recovery mapping, but because the cloud snapshots shipped by the CTA are in a tape archive format (e.g., with each incremental snapshot holding only the delta data in it) recovering a snapshot from a lineage using the CTA requires starting from the base snapshot and working all the way up incrementally until reaching the snapshot requested for recovery. This is a time-consuming process, as there is no mechanism for the CTA to get all the blocks required for the requested snapshot without incrementally recovering the previous snapshots. The recovery time increases depending on how far the requested snapshot is away from the base snapshot.

To overcome these and other disadvantages, illustrative embodiments manage snapshot recovery utilizing an instance of the snapshot and file tiering management service 112 (e.g., which may be run on the originating storage array 106-1, on another storage array such as one of the storage arrays 106-2 through 106-M, on one of the host devices 102, etc.).

If a user (e.g., of an instance of the snapshot and file tiering management service 112 provisioned with appropriate configuration data) wants to populate one or more local array volumes in a storage group using a snapshot previously shipped to cloud storage of the cloud infrastructure 128, the user via the snapshot and file tiering management service 112 can send a map of the snapshot in the cloud storage and the one or more local array volumes (also referred to below as the target array volumes) on the target storage array. In the description below, the target storage array is assumed to be the originating storage array 106-1 (e.g., that previously shipped the requested snapshot to the cloud storage of cloud infrastructure 128). It should be appreciated, however, that in other embodiments the target storage array may be another storage array different than the originating storage array (e.g., one of storage arrays 106-2 through 106-M) or a compute platform running an instance of the snapshot and file tiering management service 112 (e.g., one of the host devices 102). The recovery job is then started to copy the requested snapshot to the mapped volumes.

To implement snapshot recovery for a selected or requested snapshot stored in the cloud storage of the cloud infrastructure 128, the snapshot and file tiering management service 112 may invoke one or more APIs (e.g., the snapshot recovery API described above). In some embodiments, the snapshot recovery API is implemented as two REST APIs, a "RESTORE_PREPARE" REST API and a "RESTORE_CLEANUP" REST API. The snapshot and file tiering management service 112 receives a request to create a map of a "cloud_snapshot_id" (e.g., identifying the requested cloud snapshot) and "array_volume_id" (e.g., identifying the target array volumes where the requested snapshot is to be recovered to). Once the snapshot and file tiering management service 112 gets the recovery map from the target array, it calls the RESTORE_PREPARE REST API, which exposes the target array volumes as a device that the snapshot and file tiering management service 112 can write to.

The snapshot and file tiering management service 112 then calls another API (e.g., the snapshot differential API described above, also referred to herein as the SNAPSHOT_BITMAP REST API) on the cloud side to get the blocks that contain the actual data that needs to be recovered. The snapshot and file tiering management service 112 then uses the snapshot in the cloud storage of cloud infrastructure 128, and recovers only the blocks returned by calling the SNAPSHOT_BITMAP REST API from the cloud storage to the device exposed as described above. Once recovery is complete for the requested snapshot, the snapshot and file tiering management service 112 calls the RESTORE_CLEANUP REST API on the target array volume to un-map the exposed device. The above processing may be repeated as necessary (e.g., for each volume in the recovery map). Once all entries are completed from the recovery map, the target array volumes will have the data from the requested snapshot.

A process flow for snapshot recovery will now be described with respect to FIGS. 13A-13D. FIGS. 13A-13D show the host device 102-1 (e.g., representing a user, such as a storage administrator, that initiates a request for snapshot recovery), the SSMO module 114 (e.g., which more generally represents the snapshot and file tiering management service 112), a storage array front-end 110-1, and storage array back-end 110-2. The storage array front-end 110-1 and storage array back-end 110-2 are assumed to be implemented by the storage controllers 110 of storage array 106-1. The storage array front-end 110-1 may be viewed as a REST API or other interface for the SSMO module 114 (or other modules of the snapshot and file tiering management service 112) to access internals of the storage array 106-1 (e.g., the storage array back-end 110-2).

Figure 13A:
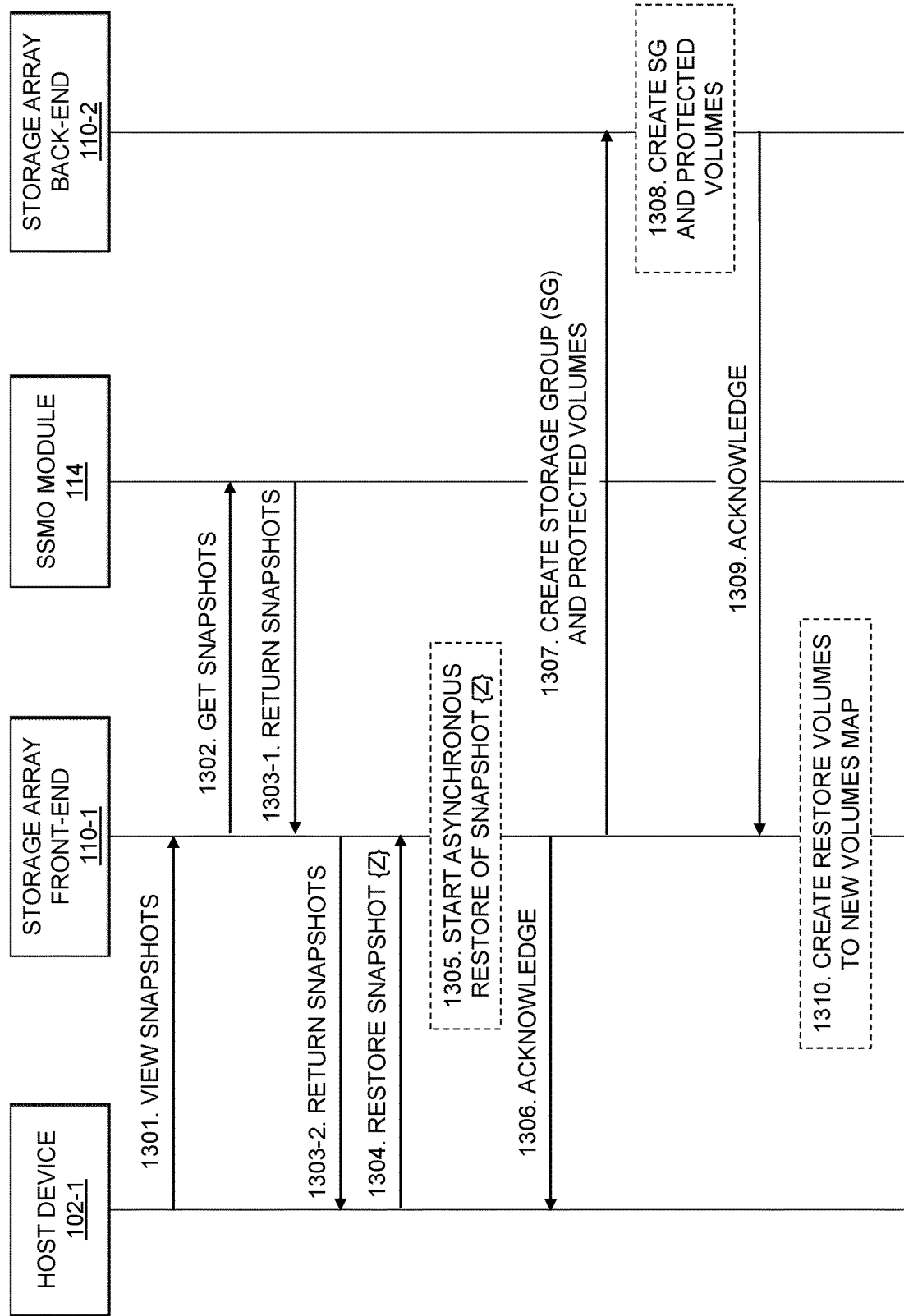
FIGS. 13A-13D illustrate a process flow for snapshot recovery in an illustrative embodiment.

The process flow of FIGS. 13A-13D begins, as shown in FIG. 13A, with step 1301 where the host device 102-1 sends a request to the storage array front-end 110-1 to view available snapshots. The storage array 110-1 in step 1302 sends a request to the SSMO module 114 to get a list of available snapshots. In step 1303-1, the SSMO module 114 returns the list of available snapshots to the storage array front-end 110-1. The storage array front-end 110-1 in step 1303-2 forwards the list of available snapshots to the host device 102-1. In step 1304, the host device 102-1 sends a request to the storage array front-end 110-1 to restore a selected snapshot (e.g., denoted {Z} in FIGS. 13A-13D). It should be noted that the list of snapshots returned in steps 1303-1 and 1303-2 may include both locally stored snapshots and snapshots stored in the cloud storage of the cloud infrastructure 128. It is assumed, in the example of FIGS. 13A-13D, that the selected snapshot {Z} is stored in the cloud storage of the cloud infrastructure 128. Similar processing, however, may be used for recovery of a locally-stored snapshot.

Figure 13B:
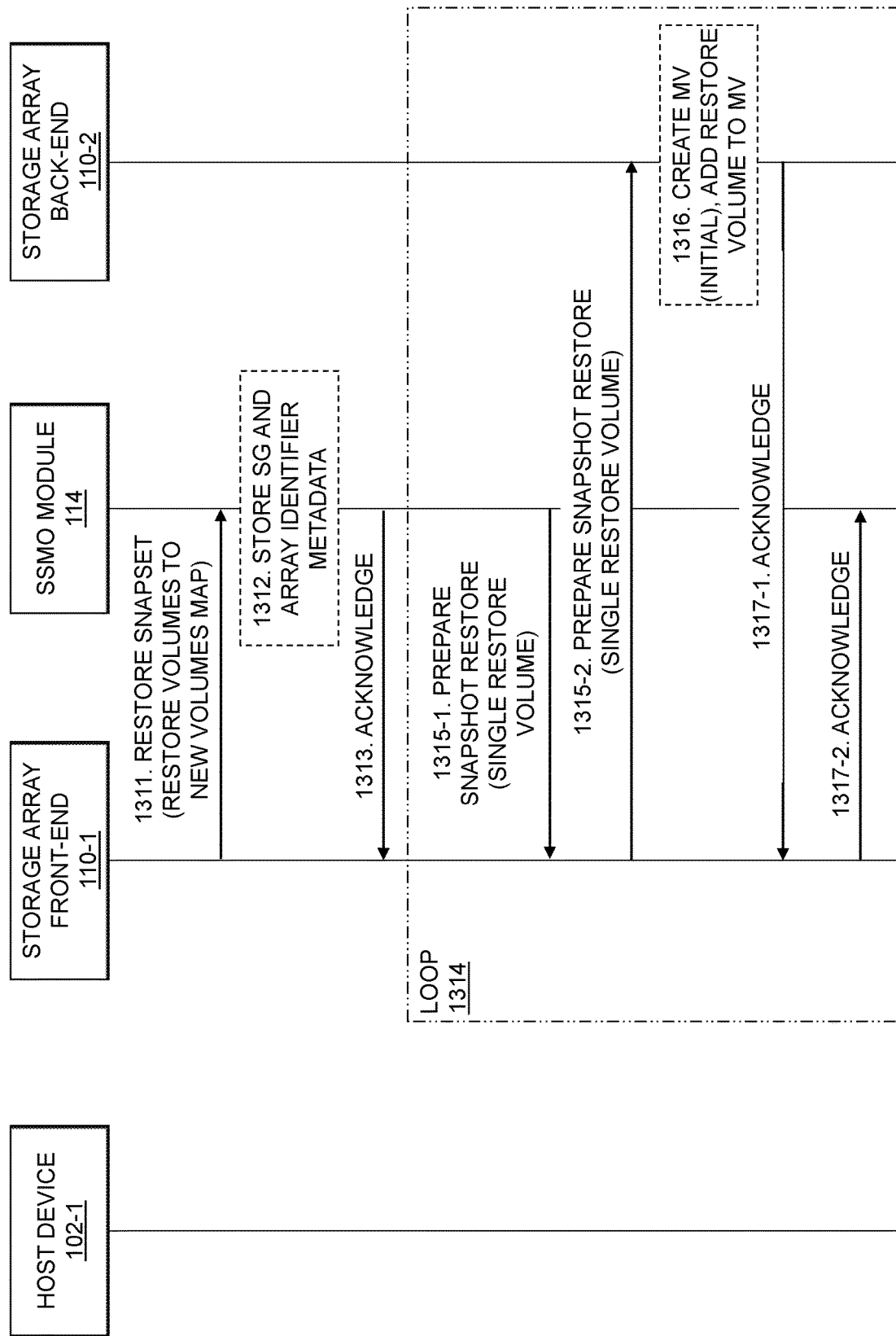

In step 1305, the storage array front-end 110-1 initiates an asynchronous restore of the selected snapshot. The storage array front-end 110-1 sends an acknowledgement (e.g., OK) to the host device 102-1 in step 1306. The storage array front-end 110-1 in step 1307 communicates with the storage array back-end 110-2 to create a storage group (SG) and protected volumes on the storage array 106-1. In step 1308, the storage array back-end 110-2 creates the SG and protected volumes on the storage array 106-1. The storage array back-end 110-2 sends an acknowledgement to the storage array front-end 110-1 in step 1309 indicating that the SG and protected volumes have been created. The storage array front-end 110-1 in step 1310 creates a recovery map (e.g., mapping restore volumes to new volumes). As shown in FIG. 13B, the storage array front-end 110-1 in step 1311 sends the recovery map, also referred to as a restore snapshot set (snapset) or restore volumes to new volumes map, to the SSMO module 114. The SSMO module 114 stores SG and array identifier metadata in step 1312, and returns an acknowledgement to the storage array front-end 110-1 in step 1313.

Figure 13C:
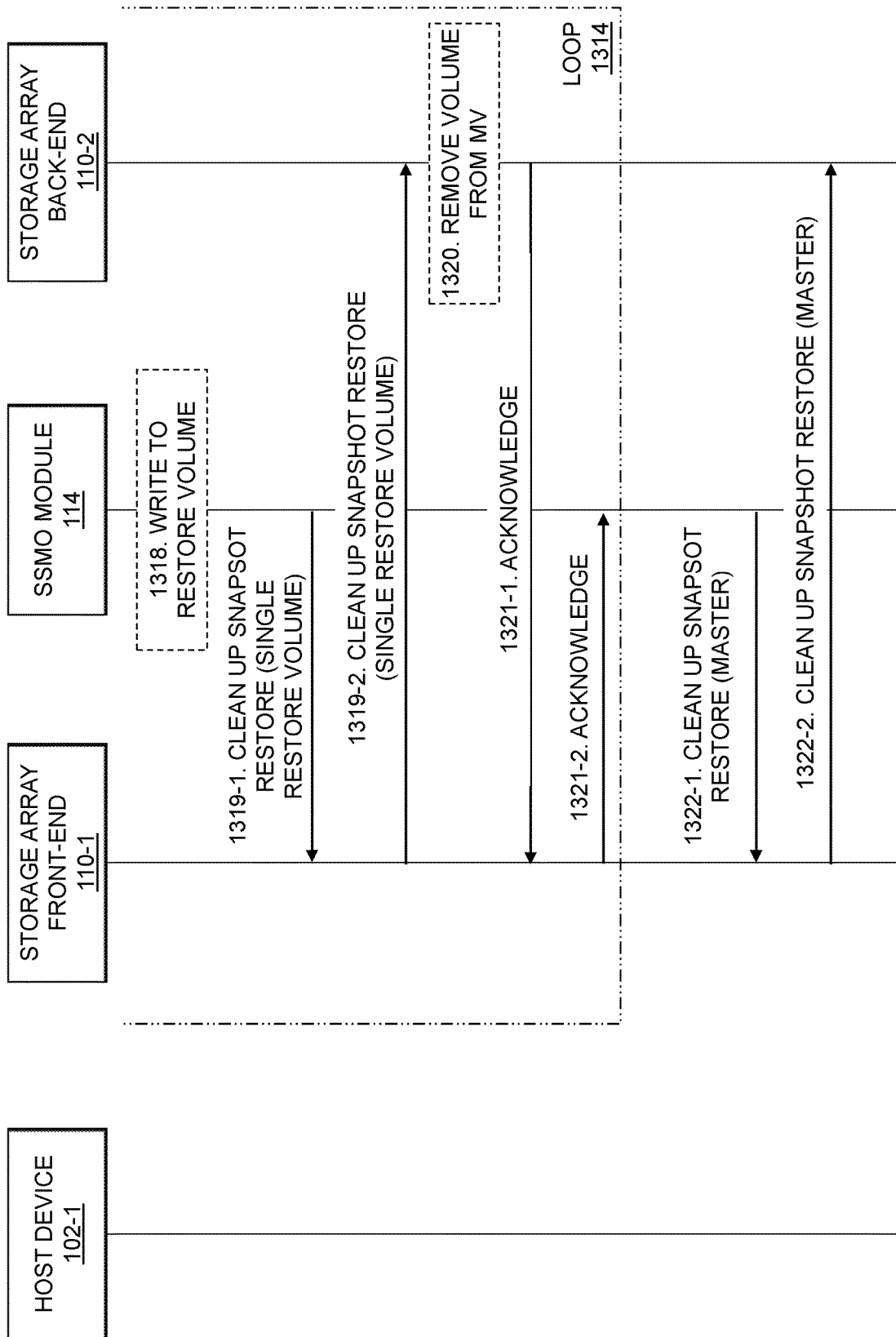

The SSMO module 114 then begins a loop 1314, running an instance of the loop 1314 for each storage volume in the recovery map. The loop 1314 begins in step 1315-1, with the SSMO module 114 requesting the storage array front-end 110-1 prepare a snapshot restore (e.g., for a single storage volume in the recovery map). The storage array front-end 110-1 forwards this request to the storage array back-end 110-2 in step 1315-2. The storage array back-end 110-2 in step 1316 creates an initial mapped volume (MV), and adds the restore volume in the step 1315-2 request to the MV. The storage array back-end 110-2 then sends an acknowledgement to the storage array front-end 110-1 in step 1317-1, which is forwarded from the storage array front-end 110-1 to the SSMO module 114 in step 1317-2. As shown in FIG. 13C, the SSMO module 114 in step 1318 writes to the restore volume (e.g., by obtaining data for the restore volume from the cloud storage of the cloud infrastructure 128).

Steps 1315 through 1318 may include the SSMO module 114 invoking the RESTORE_PREPARE REST API. The RESTORE_PREPARE REST API is used to prepare a specific cloud snapshot, and includes the resource of "cloud-snapshot" and a request type of "POST" with a description of "prepare a specific cloud snapshot." A URL of the RESTORE_PREPARE REST API may include a path parameter (e.g., of type string) that provides the unique identifier of the storage array 106-1 (e.g., where this identifier is obtained from request parameters set in a registration API call of the snapshot and file tiering management service 112). Invoking the RESTORE_PREPARE REST API utilizes a request parameter object "CloudSnapshotInput- Param" with attributes: "volume_id" of type string that comprise the volume name; and "snapshot_id" of type long that comprises the snapshot set ID.

The response to invoking the RESTORE_PREPARE REST API is synchronous and includes two objects "AccessVolumeIdentifierType" and "CloudSnapshotPrepareResultType." The "AccessVolumeIdentifierType" object includes the attribute "wwn" of type string comprising the volume external visible WWN. The "CloudSnapshotPrepareResultType" object includes the attribute "access_volume_identifier" of type "AccessVolumeIdentifierType" that comprises the linked target volume identifiers.

FIG. 14 shows a sample JSON request 1400 for invoking the RESTORE_PREPARE REST API along with a sample JSON response 1410 to invoking the RESTORE_PREPARE REST API. Response status codes for the JSON response 1410 include: 201 Created, returned when the resource is created; 400, returned when an error occurs with the validation of the request payload (e.g., the <STORAGE_GROUP> parameter should be 1-64 alphanumeric, '_' or "-" characters); 401, returned if an incorrect username, password, or both are specified; 403, returned if the specified username and password are correct, but the user is not authorized to make the request; 404, returned if the requested resources (e.g., cloud system, cloud snapshot volume, cloud snapshot, delete cloud snapshot volume, delete cloud snapshot) cannot be found; and 500, returned if a problem occurs when the system executes the command.

Returning to FIG. 13C, the process continues with the SSMO module 114 initiating clean-up of the snapshot restore (e.g., for the single restore volume) by sending a clean-up request to the storage array front-end 110-1 in step 1319-1. The storage array front-end 110-1 forwards the clean-up request to the storage array back-end in step 1319-2. In step 1320, the storage array back-end 110-2 removes the restore volume from the MV. The storage array back-end 110-2 sends an acknowledgement indicating success of the clean up to the storage array front-end 110-1 in step 1321-1. The storage array front-end 110-1 forwards this acknowledgement to the SSMO module 114 in step 1321-2. This concludes one instance of the loop 1314 (e.g., for one of the restore volumes in the recovery map).

Figure 13D:
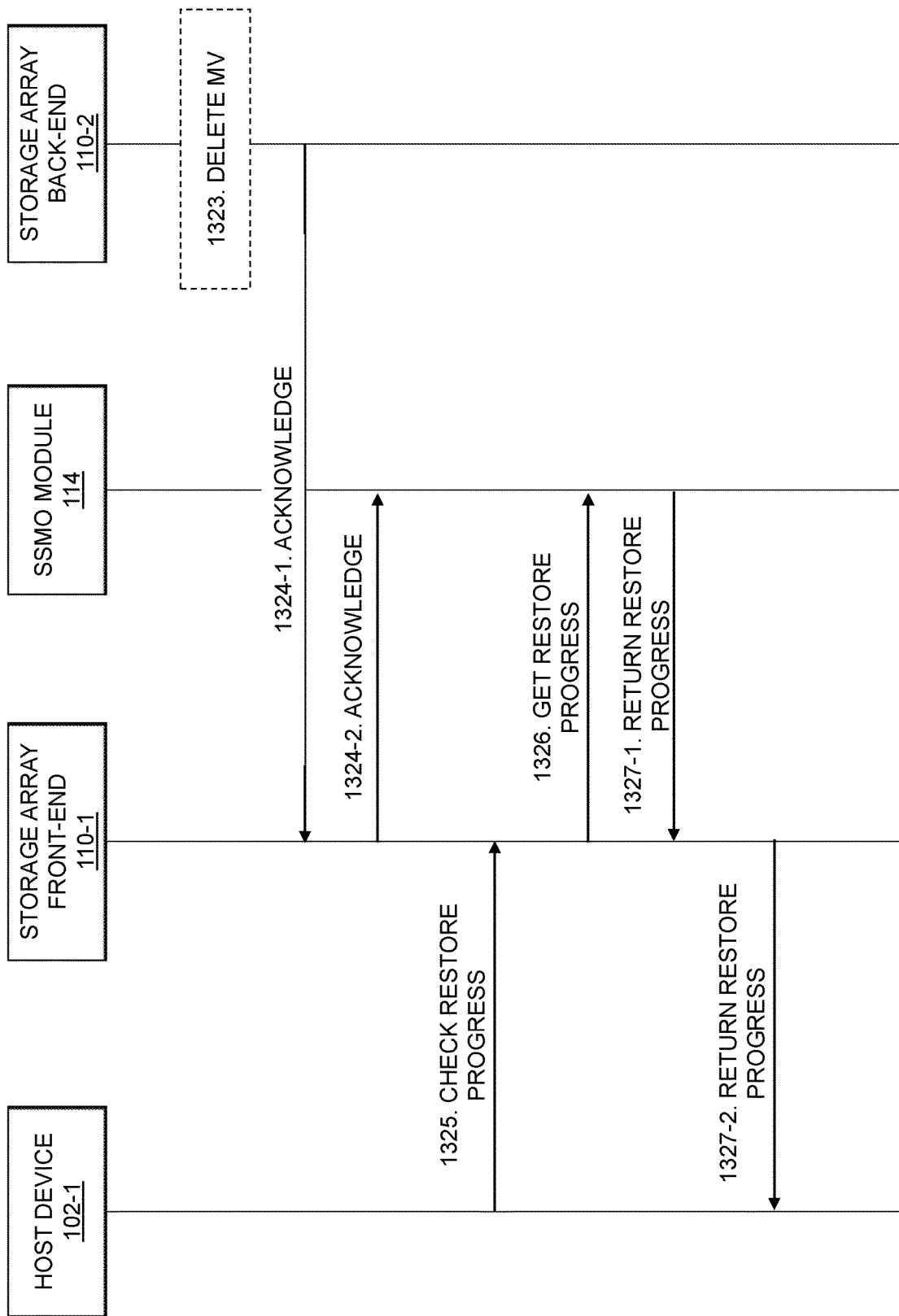

As noted above, the loop 1314 may be repeated as necessary until all restore volumes in the recovery map have been restored. Once all the restore volumes in the recovery map have been handled, the SSMO module 114 sends a request to the storage array front-end 110-1 in step 1322-1 to clean up the snapshot restore (e.g., master, rather than a single restore volume). The storage array front-end 110-1 forwards this request to the storage array back-end 110-2 in step 1322-2. As shown in FIG. 13D, the storage array back-end 110-2 in step 1323 deletes the MV. In step 1324-1, the storage array back-end 110-2 sends an acknowledgement (indicating success of the master restore cleanup) to the storage array front-end 110-1. The storage array front-end 110-1 forwards this acknowledgement to the SSMO module 114 in step 1324-2.

At any time during the snapshot recovery, the host device 102-1 may check the restore progress as illustrated in steps 1325 through 1327. In step 1325, the host device 102-1 sends a request to the storage array front-end 110-1 to check the restore progress for a selected snapshot or snapshot set. The storage array front-end 110-1 in step 1326 sends a request to the SSMO module 114 to get the restore progress. The SSMO module 114 returns the restore progress to the storage array front-end 110-1 in step 1327-1. The storage array front-end 110-1 forwards the restore progress to the host device 102-1 in step 1327-2.

Steps 1319 through 1324 may include the SSMO module 114 invoking the RESTORE_CLEANUP REST API. The RESTORE_CLEANUP REST API is used to clean up after completing restore of an individual volume, or after restoring all volumes in the recovery map. The RESTORE_CLEANUP REST API includes the resource of "cloudsnapshot" and a request type of "POST" with a description of "cleans up after all the data has been processed for a specific cloud snapshot." A URL of the RESTORE_CLEANUP REST API may include a path parameter (e.g., of type string) that provides the unique identifier of the storage array 106-1 (e.g., where this identifier is obtained from request parameters set in the registration API call of the snapshot and file tiering management service 112 as described above).

Invoking the RESTORE_CLEANUP REST API utilizes a request parameter object "CleanupSnapshotParam" with attributes: "cloud snapshot" of type "CloudSnapshotInputParam" comprising the details of the cloud snapshot to be unlinked; optional "type" enumerating COMMIT, CANCEL or MASTER specifying the type of clean up that will be performed (e.g., COMMIT may be selected by default); and optional "metadata" of type "Array[MetaDataObjectType]" comprising the associated metadata object. The response to the RESTORE_CLEANUP REST API is synchronous, and includes no content.

Figure 15:
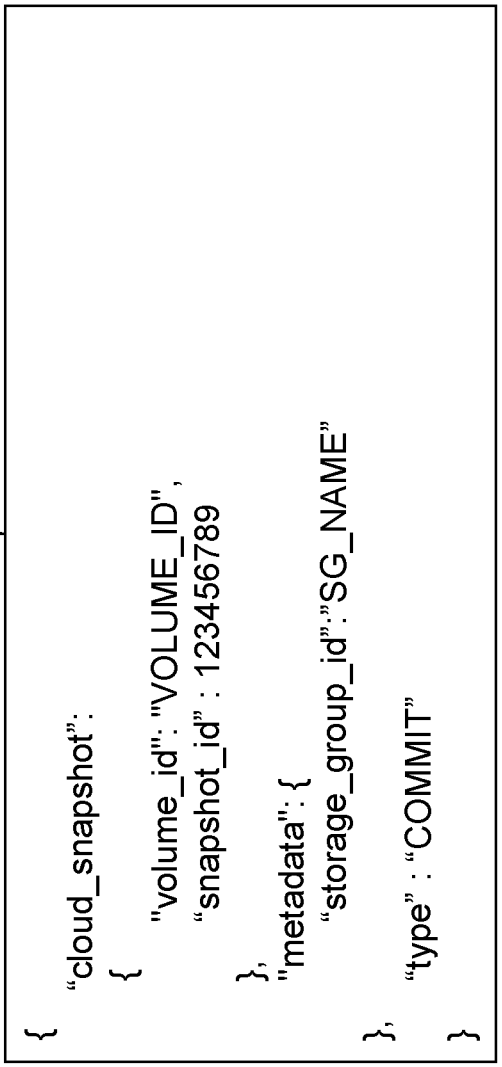
FIG. 15 shows pseudocode for a request to invoke a snapshot recovery cleanup application programming interface in an illustrative embodiment.

FIG. 15 shows a sample JSON request 1500 for invoking the RESTORE_CLEANUP REST API. Response status codes for the JSON response include: 204, No Content, returned when the resource is cleaned up or deleted successfully; 400, returned when an error occurs with the validation of the request payload (e.g., the <STORAGE_GROUP> parameter should be 1-64 alphanumeric, '_' or "-" characters); 401, returned if an incorrect username, password, or both are specified; 403, returned if the specified username and password are correct, but the user is not authorized to make the request; 404, returned if the requested resources (e.g., cloud system, cloud snapshot volume, cloud snapshot, delete cloud snapshot volume, delete cloud snapshot) cannot be found; and 500, returned if a problem occurs when the system executes the command.

As noted above, the snapshot and file tiering management service 112 may call or invoke the SNAPSHOT_BITMAP REST API on the cloud side to get the blocks that contain the actual data that needs to be recovered.

Snapshots on the storage arrays 106 can be very large, and thus moving, copying or otherwise shipping snapshots to the cloud storage of cloud infrastructure 128 can take a significant amount of time. Moving the snapshot data from the storage arrays 106 to the cloud storage of cloud infrastructure 128 may utilize one or more public networks (e.g., the Internet), and thus this process can be slow and prone to outages or failures. The snapshot and file tiering management service 112, therefore, needs to have the ability to temporarily stop (e.g., pause) the snapshot shipping. To restart the movement of the snapshot data from the beginning (e.g., by clearing all the data in a previous snapshot shipping attempt) can prove to be tedious, hogging resources and wasting bandwidth. Illustrative embodiments provide functionality for the snapshot and file tiering management service 112 to pause shipping of a snapshot to cloud storage, and to later resume shipping of the snapshot from the point of previous stoppage (e.g., utilizing the snapshot checkpointing module 414 and snapshot checkpointing cache 416 of SSMO module 114 illustrated in FIG. 4).

In some embodiments, pause and resume of snapshot shipping is enabled in the snapshot and file tiering management service 112 through a checkpointing mechanism. As used herein, the term "checkpoint" refers to a chunk of data that is cached locally in memory of a storage array and is committed to the cloud. For example, a checkpoint may be stored locally in an originating storage array (e.g., storage array 106-1) that is shipping a snapshot to cloud storage of cloud infrastructure 128. A checkpoint, in some embodiments, is a chunk of data of a specific size (e.g., for each snapshot being shipped).

The particular size of each checkpoint may be pre-defined, but alterable by a storage administrator or other authorized user (e.g., using one of the host devices 102 to access and modify a checkpointing configuration of the snapshot and file tiering management service 112). Depending on the use case, it may be desired to increase or decrease the size of the checkpoints. For example, if it is expected that snapshot shipping operations will be frequently paused and resumed (e.g., such as when the network connection between the storage array 106-1 and the cloud infrastructure 128 is determined to be prone to failure), it may be desired to decrease the size of each checkpoint. If it is expected that the snapshot shipping operations will not be paused and resumed frequently, the size of each checkpoint may be increased. The checkpoint size for a snapshot may also, in some embodiments, be based at least in part on the overall size of the snapshot, such that the snapshot will be split into a designated number of checkpoints (e.g., 10 checkpoints) regardless of the overall size of the snapshot. The checkpoint size may also or alternatively be based on other characteristics of the snapshot (e.g., priority or criticality of the snapshot).

To start snapshot shipping, the snapshot and file tiering management service 112 (e.g., the SSMO module 114 thereof) creates a checkpoint. The SSMO module 114 then writes data to a local checkpointing cache on the originating storage array 106-1. Once the pre-defined size of data is written to the local checkpointing cache, a checkpoint commit is issued. The checkpoint mechanism saves the cached data to the cloud storage of cloud infrastructure 128 as a set of one or more cloud objects. Once the entire cached data (e.g., for the checkpoint being committed) is written to the cloud storage of cloud infrastructure 128, the checkpoint is considered committed. The SSMO module 114 maintains or tracks the lasted committed checkpoint, as well as a current checkpoint that is moving data for snapshot shipping to the cloud storage of cloud infrastructure 128. In addition, the SSMO module 114 saves checkpointing metadata including the last logical block address (LBA) and size read from the originating storage array 106-1 for a particular checkpoint. This information is used to resume snapshot shipping from a previous stoppage point as described in further detail below.

When a snapshot shipping operation starts, the SSMO module 114 checks to see if the snapshot shipping operation is a resume of a previous snapshot shipping operation. If yes, the SSMO module 114 checks the status of the current checkpoint value saved in the local cache. If the current checkpoint value is committed to the cloud storage of the cloud infrastructure 128, the SSMO module 114 marks the current checkpoint value as an old checkpoint value, and creates a new checkpoint and starts reading from the storage array 106-1 from the point it last read (e.g., which is saved in the checkpointing metadata as the last LBA and size read from the storage array 106-1). If the current checkpoint value was not saved (e.g., not committed to the cloud storage of the cloud infrastructure 128 and therefore resulting in an incomplete checkpoint), the SSMO module 114 clears the partial data which was uploaded for the incomplete checkpoint. The SSMO module 114 then proceeds with the snapshot shipping operation by determining the last read point from the storage array 106-1 (e.g., which is saved in the checkpointing metadata for the previous or last committed checkpoint) and creating a new checkpoint.

The snapshot management interface 402 of the SSMO module 114 permits authorized users (e.g., an administrator of storage array 106-1) utilizing one or more the host devices 102 to pause and resume snapshot shipping operations, to create and modify checkpoint policies for snapshot shipping operations (e.g., for defining a checkpoint size for snapshot shipping operations), etc. via the snapshot checkpointing module 414. The snapshot checkpointing module 414 is configured, during snapshot shipping operations, to create and store checkpoints and associated metadata in the snapshot checkpointing cache 416 (e.g., implemented using local storage of the storage array 106-1). The snapshot checkpointing module 414 is further configured to commit the checkpoints stored therein to the cloud storage of cloud infrastructure 128.

An exemplary process for recovering snapshots from a cloud snapshot lineage on cloud storage to a storage system will now be described in more detail with reference to the flow diagram of FIG. 16. It is to be understood that this particular process is only an example, and that additional or alternative processes for recovering snapshots from a cloud snapshot lineage on cloud storage to a storage system may be used in other embodiments.

In this embodiment, the process includes steps 1600 through 1608. These steps are assumed to be performed by the snapshot and file tiering management service 112 utilizing one or more of the SSMO module 114, VTO virtualization module 116, file-level tiering orchestration module 118, FTO virtualization module 120, cloud abstraction module 122, storage array interface module 124, and cloud interface module 126.

The process begins with step 1600, identifying a snapshot lineage comprising one or more snapshots of a given set of one or more storage volumes. The snapshot lineage comprises (i) a local snapshot lineage stored on at least one of one or more storage devices (e.g., storage devices 108) of a storage system (e.g., storage array 106-1) and (ii) at least one cloud snapshot lineage stored on cloud storage of at least one cloud external to the storage system (e.g., cloud infrastructure 128). The at least one cloud snapshot lineage may comprise at least a subset of the one or more snapshots of the given set of one or more storage volumes that have been copied to the cloud storage of the at least one cloud external to the storage system. The given set of one or more storage volumes may have originated at the storage system, or at an additional storage system.

In step 1602, at least one snapshot is selected to recover from the at least one cloud snapshot lineage to the storage system. Step 1600 may include invoking an API to submit a request for a list of snapshots of the at least one cloud snapshot lineage, and receiving a response to invoking the API, the response comprising the list of snapshots of the at least one cloud snapshot lineage. Step 1602 may include selecting one of the snapshots from the list of snapshots of the at least one cloud snapshot lineage.

A set of one or more new storage volumes is created on the storage system in step 1604. In some embodiments, step 1604 includes creating a new storage group on the storage system and creating the set of one or more new storage volumes as protected storage volumes in the new storage group. A recovery map is generated in step 1606, where the recovery map links each of a set of one or more cloud storage volumes on the cloud storage of the at least one cloud that comprises data of the selected at least one snapshot to at least one of the set of one or more new storage volumes on the storage system. The selected at least one snapshot is recovered from the at least one cloud snapshot lineage to the storage system in step 1608 by copying data from the set of one or more cloud storage volumes to corresponding linked ones of the set of new storage volumes on the storage system.

Step 1606 may comprise for a given cloud storage volume in the set of cloud storage volumes: invoking an API (e.g., the above-described snapshot recovery API or RESTORE_PREPARE REST API) to submit a request to prepare the given cloud storage volume for restore to a subset of the set of new storage volumes on the storage system, the request comprising a volume identifier associated with the given cloud storage volume and a snapshot set identifier for the snapshot lineage; and receiving a response to invoking the API, the response comprising access volume information for the subset of the set of new storage volumes on the storage system, the access volume information comprising an externally addressable volume identifier for the subset of the set of new storage volumes on the storage system and volume identifiers for each new storage volume in the subset of the set of new storage volumes on the storage system. The API may comprise a REST API with an endpoint URL specifying a path parameter comprising a unique identifier of the storage system.

Figure 16:
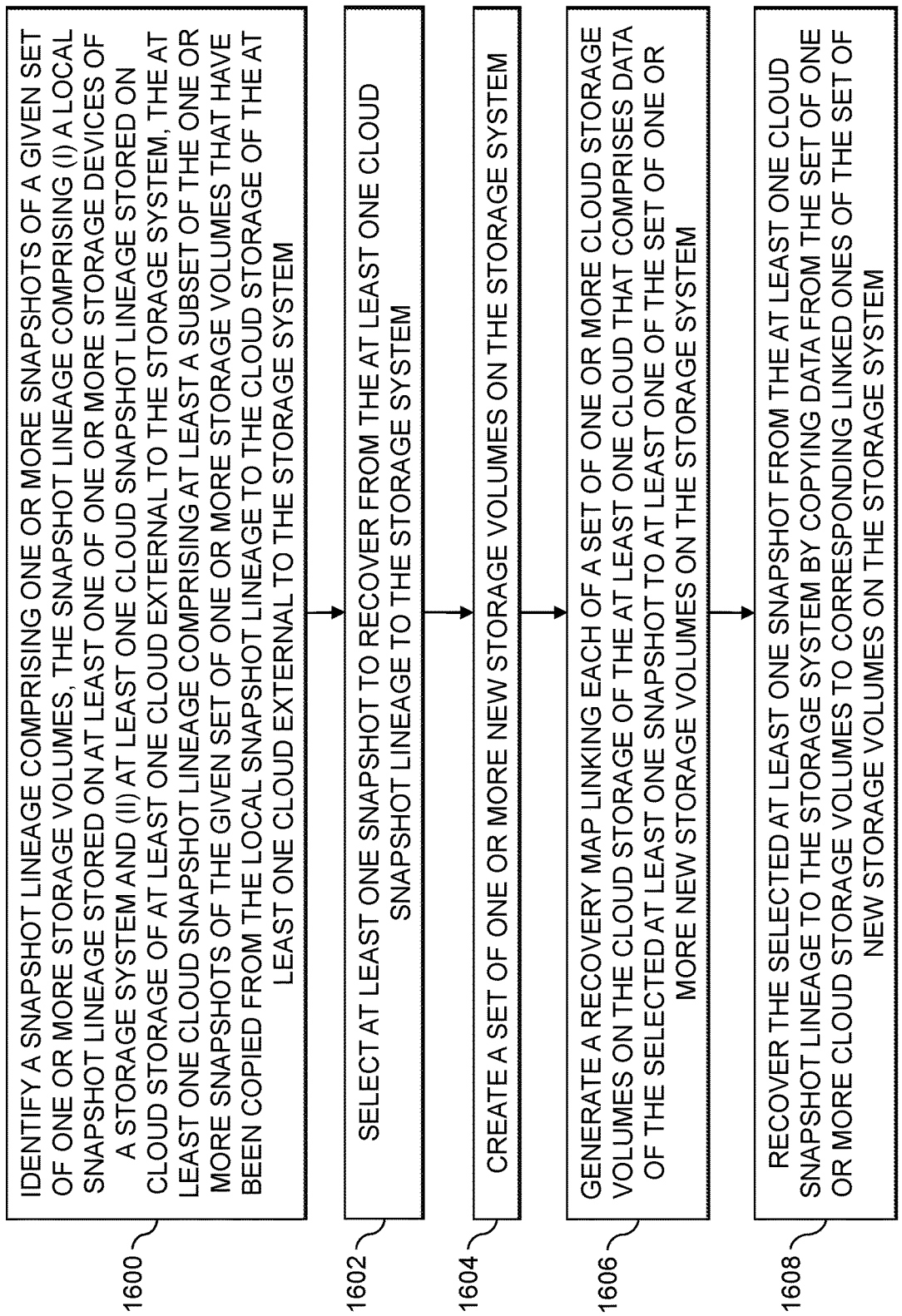
FIG. 16 is a flow diagram of an exemplary process for recovering snapshots from a cloud snapshot lineage on cloud storage to a storage system in an illustrative embodiment.

In some embodiments, the FIG. 16 process also includes determining at least a subset of data (e.g., a snapshot differential relative to one or more snapshots of the local snapshot lineage currently stored on the storage system) of the selected at least one snapshot that is to be copied from the set of one or more cloud storage volumes to the set of one or more new storage volumes on the storage system. In such embodiments, step 1608 may include copying the determined subset of the data of the selected at least one snapshot from the set of one or more cloud storage volumes to corresponding linked ones of the set of new storage volumes on the storage system.

Determining the subset of the data of the selected at least one snapshot may comprise: invoking an API (e.g., the above-described snapshot differential API or SNAPSHOT_BITMAP REST API) to submit a request for a bitmap of data of the selected at least one snapshot to be recovered to the storage system, the request comprising a snapshot identifier for the selected at least one snapshot, at least one starting track location of the data of the selected at least one snapshot on the cloud storage, at least one track count of a number of tracks from the at least one starting track location on the cloud storage that comprise the data of the selected at least one snapshot; and receiving a response to invoking the API, the response comprising the bitmap of the data of the selected at least one snapshot to be recovered to the storage system, the bitmap comprising, for each cloud storage volume in the set of cloud storage volumes comprising the data of the selected at least one snapshot: a cloud storage volume name; a volume name of the selected at least one snapshot; a count representing a size of the data of the at least one snapshot; and a pointer to an array comprising bitmaps of the tracks of the cloud storage volumes comprising the data of the selected at least one snapshot. The request may further comprise an identifier of a local snapshot in the snapshot lineage stored in the local snapshot lineage, the at least one starting track location may specify a comparison starting track location for comparison between the data of the selected at least one snapshot and data of the local snapshot in the snapshot lineage, and the at least one track count may specify a number of tracks from the comparison starting track location comprising data to be compared for differences between the selected at least one snapshot and the local snapshot in the snapshot lineage.

In some embodiments, the FIG. 16 process also includes, responsive to successfully recovering the selected at least one snapshot from the at least one cloud snapshot lineage to the storage system in step 1608, removing the selected at least one snapshot from the at least one cloud snapshot lineage on the cloud storage of the at least one cloud external to the storage system. Removing the selected at least one snapshot from the at least one cloud snapshot lineage may comprise: invoking an API (e.g., the above-described snapshot recovery API or RESTORE_CLEANUP REST API) to submit a request to clean up the at least one cloud snapshot lineage, the request comprising an identifier of the selected at least one snapshot; and receiving a response to invoking the API, the response comprising an indication of success of removal of the selected at least one snapshot from the at least one cloud snapshot lineage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for recovering snapshots from a cloud snapshot lineage on cloud storage to a storage system will now be described in greater detail with reference to FIGS. 17 and 18. Although described in the context of system 100, these platforms may also be used to implement at least portions of other information processing systems in other embodiments.

Figure 17:
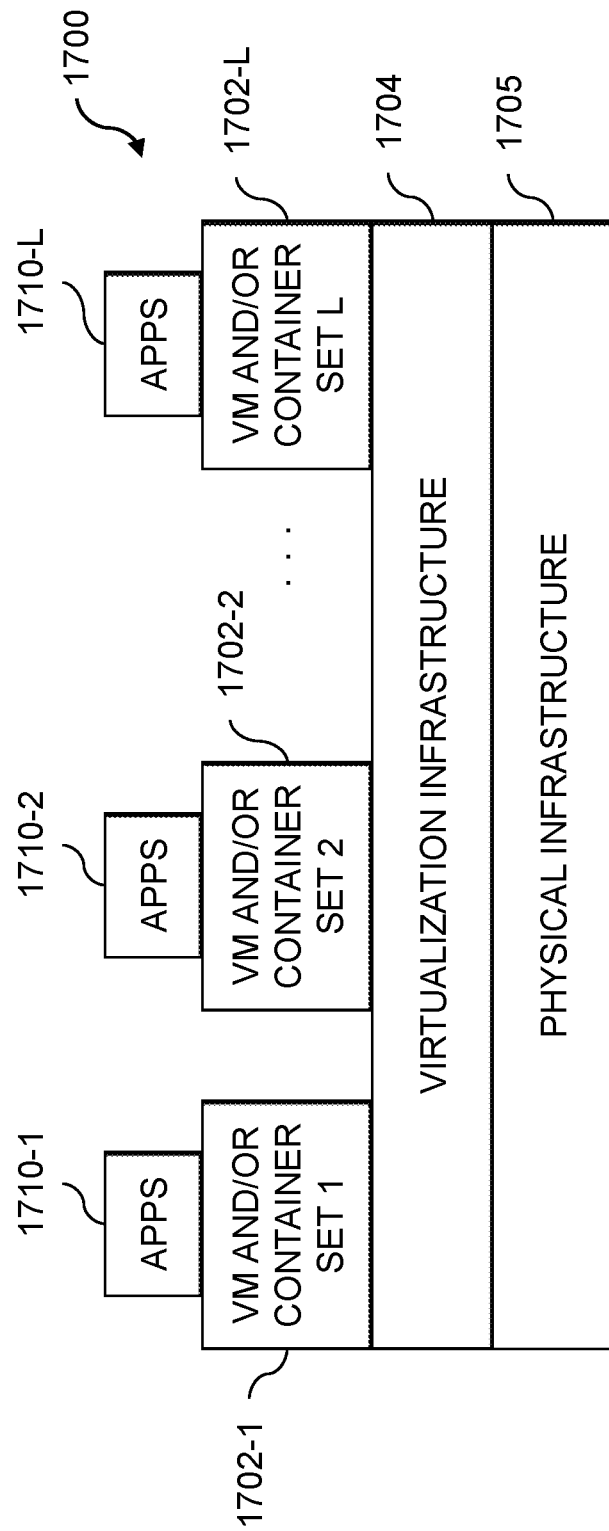
FIGS. 17 and 18 show examples of processing platforms that may be utilized to implement at least a portion of an information processing system in illustrative embodiments.
Figure 18:
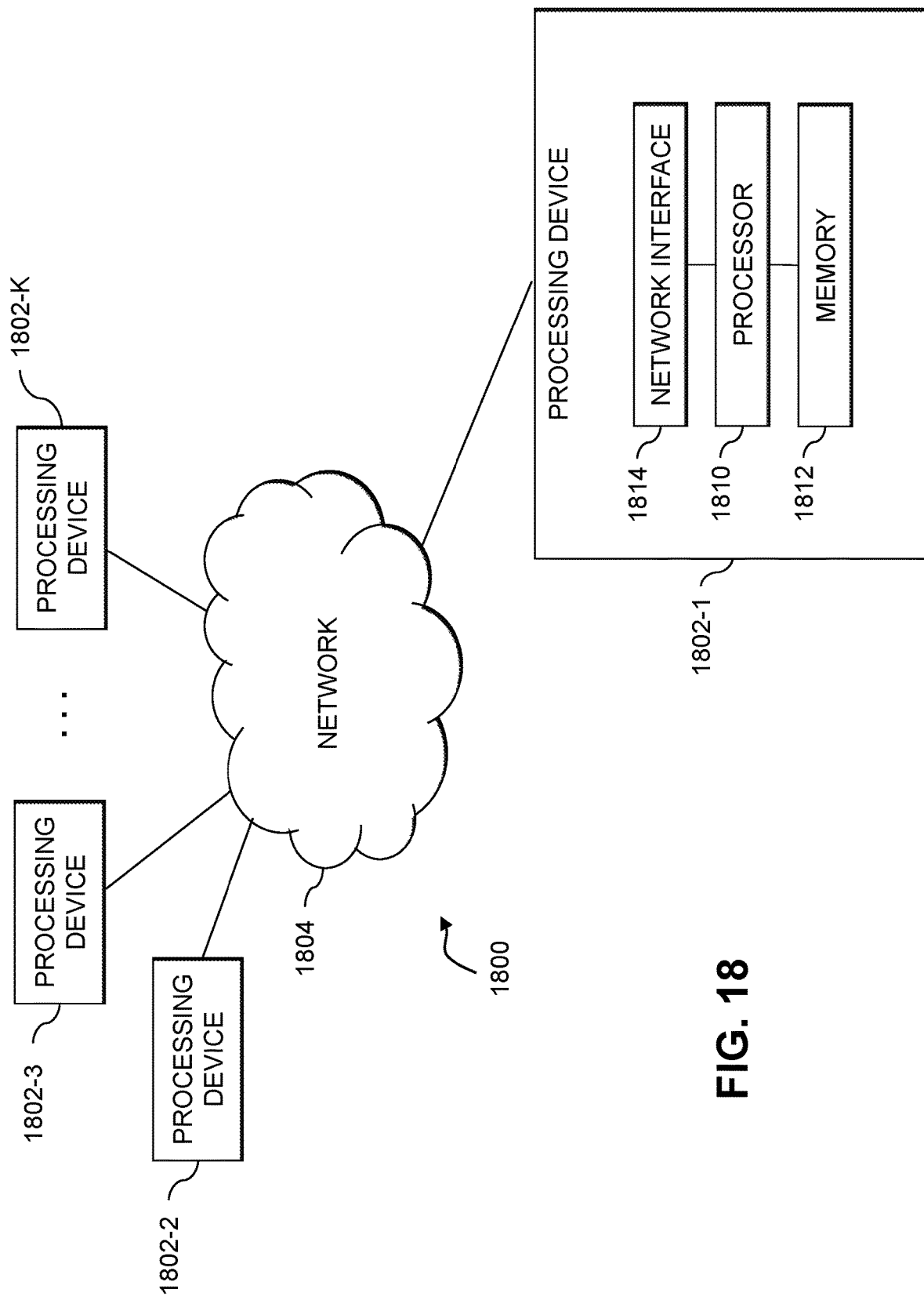

FIG. 17 shows an example processing platform comprising cloud infrastructure 1700. The cloud infrastructure 1700 comprises a combination of physical and virtual processing resources that may be utilized to implement at least a portion of the information processing system 100 in FIG. 1. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for recovering snapshots from a cloud snapshot lineage on cloud storage to a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, snapshot policies, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to identify a snapshot lineage comprising one or more snapshots of a given set of one or more storage volumes, the snapshot lineage comprising (i) a local snapshot lineage stored on at least one of one or more storage devices of a storage system and (ii) at least one cloud snapshot lineage stored on cloud storage of at least one cloud external to the storage system, the at least one cloud snapshot lineage comprising at least a subset of the one or more snapshots of the given set of one or more storage volumes that have been copied from the local snapshot lineage to the cloud storage of the at least one cloud external to the storage system;
to select at least one snapshot to recover from the at least one cloud snapshot lineage to the storage system;
to create a set of one or more new storage volumes on the storage system;

to generate a recovery map linking each of a set of one or more cloud storage volumes on the cloud storage of the at least one cloud that comprises data of the selected at least one snapshot to at least one of the set of one or more new storage volumes on the storage system; and to recover the selected at least one snapshot from the at least one cloud snapshot lineage to the storage system by copying data from the set of one or more cloud storage volumes to corresponding linked ones of the set of new storage volumes on the storage system.

2. The apparatus of claim 1 wherein the given set of one or more storage volumes originated at the storage system.

3. The apparatus of claim 1 wherein the given set of one or more storage volumes originated at an additional storage system.

4. The apparatus of claim 1 wherein identifying the snapshot lineage comprises:

invoking an application programming interface to submit a request for a list of snapshots of the at least one cloud snapshot lineage; and receiving a response to invoking the application programming interface, the response comprising the list of snapshots of the at least one cloud snapshot lineage.

5. The apparatus of claim 4 wherein selecting the at least one snapshot comprises selecting one of the snapshots from the list of snapshots of the at least one cloud snapshot lineage.

6. The apparatus of claim 1 wherein creating the set of one or more new storage volumes on the storage system comprises:

creating a new storage group on the storage system; and creating the set of one or more new storage volumes as protected storage volumes in the new storage group.

7. The apparatus of claim 1 wherein generating the recovery map comprises, for a given cloud storage volume in the set of cloud storage volumes:

invoking an application programming interface to submit a request to prepare the given cloud storage volume for restore to a subset of the set of new storage volumes on the storage system, the request comprising a volume identifier associated with the given cloud storage volume and a snapshot set identifier for the snapshot lineage; and receiving a response to invoking the application programming interface, the response comprising access volume information for the subset of the set of new storage volumes on the storage system, the access volume information comprising an externally addressable volume identifier for the subset of the set of new storage volumes on the storage system and volume identifiers for each new storage volume in the subset of the set of new storage volumes on the storage system.

8. The apparatus of claim 7 wherein the application programming interface comprises a representational state transfer application programming interface, and wherein the request comprises an endpoint uniform resource locator specifying a path parameter comprising a unique identifier of the storage system.

9. The apparatus of claim 1 wherein the at least one processing device is further configured to determine at least a subset of data of the selected at least one snapshot that is to be copied from the set of one or more cloud storage volumes to the set of one or more new storage volumes on the storage system, and wherein recovering the selected at least one snapshot from the at least one cloud snapshot lineage to the storage system comprises copying the determined subset of the data of the selected at least one snapshot from the set of one or more cloud storage volumes to corresponding linked ones of the set of new storage volumes on the storage system.

10. The apparatus of claim 9 wherein determining the subset of the data of the selected at least one snapshot comprises:

invoking an application programming interface to submit a request for a bitmap of data of the selected at least one snapshot to be recovered to the storage system, the request comprising a snapshot identifier for the selected at least one snapshot, at least one starting track location of the data of the selected at least one snapshot on the cloud storage, at least one track count of a number of tracks from the at least one starting track location on the cloud storage that comprise the data of the selected at least one snapshot; and receiving a response to invoking the application programming interface, the response comprising the bitmap of the data of the selected at least one snapshot to be recovered to the storage system, the bitmap comprising, for each cloud storage volume in the set of cloud storage volumes comprising the data of the selected at least one snapshot: a cloud storage volume name; a volume name of the selected at least one snapshot; a count representing a size of the data of the at least one snapshot; and a pointer to an array comprising bitmaps of the tracks of the cloud storage volumes comprising the data of the selected at least one snapshot.

11. The apparatus of claim 10 wherein the request further comprises an identifier of a local snapshot in the snapshot lineage stored in the local snapshot lineage, the at least one starting track location specifies a comparison starting track location for comparison between the data of the selected at least one snapshot and data of the local snapshot in the snapshot lineage, and the at least one track count specifies a number of tracks from the comparison starting track location comprising data to be compared for differences between the selected at least one snapshot and the local snapshot in the snapshot lineage.

12. The apparatus of claim 1 wherein the at least one processing device is further configured, responsive to successfully recovering the selected at least one snapshot from the at least one cloud snapshot lineage to the storage system, to remove the selected at least one snapshot from the at least one cloud snapshot lineage on the cloud storage of the at least one cloud external to the storage system.

13. The apparatus of claim 1 wherein removing the selected at least one snapshot from the at least one cloud snapshot lineage comprises:

invoking an application programming interface to submit a request to clean up the at least one cloud snapshot lineage, the request comprising an identifier of the selected at least one snapshot; and receiving a response to invoking the application programming interface, the response comprising an indication of success of removal of the selected at least one snapshot from the at least one cloud snapshot lineage.

14. The apparatus of claim 1 wherein the at least one processing device is part of the storage system.

15. A computer program product comprising a non-transitory processor-readable storage medium having stored therein program code of one or more software programs, wherein the program code when executed by at least one processing device causes the at least one processing device to perform steps of:

identifying a snapshot lineage comprising one or more snapshots of a given set of one or more storage volumes, the snapshot lineage comprising (i) a local snapshot lineage stored on at least one of one or more storage devices of a storage system and (ii) at least one cloud snapshot lineage stored on cloud storage of at least one cloud external to the storage system, the at least one cloud snapshot lineage comprising at least a subset of the one or more snapshots of the given set of one or more storage volumes that have been copied from the local snapshot lineage to the cloud storage of the at least one cloud external to the storage system;

selecting at least one snapshot to recover from the at least one cloud snapshot lineage to the storage system;

creating a set of one or more new storage volumes on the storage system;

generating a recovery map linking each of a set of one or more cloud storage volumes on the cloud storage of the at least one cloud that comprises data of the selected at least one snapshot to at least one of the set of one or more new storage volumes on the storage system; and recovering the selected at least one snapshot from the at least one cloud snapshot lineage to the storage system by copying data from the set of one or more cloud storage volumes to corresponding linked ones of the set of new storage volumes on the storage system.

16. The computer program product of claim 15 wherein generating the recovery map comprises, for a given cloud storage volume in the set of cloud storage volumes:

invoking an application programming interface to submit a request to prepare the given cloud storage volume for restore to a subset of the set of new storage volumes on the storage system, the request comprising a volume identifier associated with the given cloud storage volume and a snapshot set identifier for the snapshot lineage; and receiving a response to invoking the application programming interface, the response comprising access volume information for the subset of the set of new storage volumes on the storage system, the access volume information comprising an externally addressable volume identifier for the subset of the set of new storage volumes on the storage system and volume identifiers for each new storage volume in the subset of the set of new storage volumes on the storage system.

17. The computer program product of claim 15 wherein the program code when executed by the at least one processing device further causes the at least one processing device to perform the step of determining at least a subset of data of the selected at least one snapshot that is to be copied from the set of one or more cloud storage volumes to the set of one or more new storage volumes on the storage system, and wherein recovering the selected at least one snapshot from the at least one cloud snapshot lineage to the storage system comprises copying the determined subset of the data of the selected at least one snapshot from the set of one or more cloud storage volumes to corresponding linked ones of the set of new storage volumes on the storage system.

18. A method comprising steps of:

identifying a snapshot lineage comprising one or more snapshots of a given set of one or more storage volumes, the snapshot lineage comprising (i) a local snapshot lineage stored on at least one of one or more storage devices of a storage system and (ii) at least one cloud snapshot lineage stored on cloud storage of at least one cloud external to the storage system, the at least one cloud snapshot lineage comprising at least a subset of the one or more snapshots of the given set of one or more storage volumes that have been copied from the local snapshot lineage to the cloud storage of the at least one cloud external to the storage system;

selecting at least one snapshot to recover from the at least one cloud snapshot lineage to the storage system;

creating a set of one or more new storage volumes on the storage system;

generating a recovery map linking each of a set of one or more cloud storage volumes on the cloud storage of the at least one cloud that comprises data of the selected at least one snapshot to at least one of the set of one or more new storage volumes on the storage system; and recovering the selected at least one snapshot from the at least one cloud snapshot lineage to the storage system by copying data from the set of one or more cloud storage volumes to corresponding linked ones of the set of new storage volumes on the storage system;

wherein the method is performed by at least one processing device comprising a processor coupled to a memory.

19. The method of claim 18 wherein generating the recovery map comprises, for a given cloud storage volume in the set of cloud storage volumes:

invoking an application programming interface to submit a request to prepare the given cloud storage volume for restore to a subset of the set of new storage volumes on the storage system, the request comprising a volume identifier associated with the given cloud storage volume and a snapshot set identifier for the snapshot lineage; and receiving a response to invoking the application programming interface, the response comprising access volume information for the subset of the set of new storage volumes on the storage system, the access volume information comprising an externally addressable volume identifier for the subset of the set of new storage volumes on the storage system and volume identifiers for each new storage volume in the subset of the set of new storage volumes on the storage system.

20. The method of claim 18 further comprising determining at least a subset of data of the selected at least one snapshot that is to be copied from the set of one or more cloud storage volumes to the set of one or more new storage volumes on the storage system, and wherein recovering the selected at least one snapshot from the at least one cloud snapshot lineage to the storage system comprises copying the determined subset of the data of the selected at least one snapshot from the set of one or more cloud storage volumes to corresponding linked ones of the set of new storage volumes on the storage system.

* * * * *